United States Patent
Yamanaka et al.

(10) Patent No.: US 12,024,863 B2
(45) Date of Patent: Jul. 2, 2024

(54) SYSTEM INCLUDING WORK MACHINE, COMPUTER IMPLEMENTED METHOD, METHOD FOR PRODUCING TRAINED POSITION ESTIMATION MODEL, AND TRAINING DATA

(71) Applicant: KOMATSU LTD., Tokyo (JP)

(72) Inventors: Nobuyoshi Yamanaka, Tokyo (JP); Toshiaki Kumagai, Tokyo (JP); Kensuke Fujii, Tokyo (JP)

(73) Assignee: KOMATSU LTD., Tokyo (JP)

( * ) Notice: Subject to any disclaimer, the term of this patent is extended or adjusted under 35 U.S.C. 154(b) by 458 days.

(21) Appl. No.: 17/296,314

(22) PCT Filed: Jan. 23, 2020

(86) PCT No.: PCT/JP2020/002251
§ 371 (c)(1),
(2) Date: May 24, 2021

(87) PCT Pub. No.: WO2020/158557
PCT Pub. Date: Aug. 6, 2020

(65) Prior Publication Data
US 2022/0049477 A1    Feb. 17, 2022

(30) Foreign Application Priority Data
Jan. 29, 2019    (JP) .................................. 2019-013405

(51) Int. Cl.
*E02F 9/26*    (2006.01)
*E02F 9/22*    (2006.01)
*G06F 18/214*    (2023.01)

(52) U.S. Cl.
CPC ............ *E02F 9/265* (2013.01); *E02F 9/2228* (2013.01); *E02F 9/2235* (2013.01); *G06F 18/214* (2023.01)

(58) Field of Classification Search
CPC ...................................................... E02F 9/265
See application file for complete search history.

(56) References Cited

U.S. PATENT DOCUMENTS 9,551,133 B2 *    1/2017    Ikegami .................. E02F 3/435
10,373,406 B2 *    8/2019    Egawa ................. G07C 5/0808
(Continued)

FOREIGN PATENT DOCUMENTS

| CN | 104246428 A | 12/2014 |
|---|---|---|
| CN | 106716455 A | 5/2017 |

(Continued)

*Primary Examiner* — Michael A Berns
(74) *Attorney, Agent, or Firm* — Faegre Drinker Biddle & Reath LLP

(57) ABSTRACT

There is provided a system including a work machine, comprising a main body of the work machine, a work implement attached to the main body of the work machine, an operating member operated to operate the work implement, and a computer. The computer has a trained position estimation model for determining the position of a portion of the work implement that is a target of positional estimation. The computer obtains an operation command value causing the work implement to make a movement in response to an operation of the operating member, uses the trained position estimation model to estimate from the operation command value an amount of displacement of the target of positional estimation from a reference position, and outputs an estimated position that is a position of the target of positional estimation estimated from the reference position and the amount of displacement.

18 Claims, 15 Drawing Sheets

(56) References Cited

U.S. PATENT DOCUMENTS

| | | | |
|---|---|---|---|
| 10,435,870 B2 * | 10/2019 | Narikawa | F02D 29/00 |
| 10,471,610 B2 * | 11/2019 | Han | B25J 19/0016 |
| 10,706,331 B2 * | 7/2020 | Shibata | G06N 20/00 |
| 11,168,458 B2 * | 11/2021 | Shimizu | E02F 9/26 |
| 2013/0103247 A1 | 4/2013 | Ogawa et al. | |
| 2015/0299986 A1 | 10/2015 | Ikegami et al. | |
| 2016/0247332 A1 | 8/2016 | Egawa | |
| 2018/0171582 A1 | 6/2018 | Yamada et al. | |
| 2018/0266083 A1 | 9/2018 | Narikawa et al. | |
| 2018/0330200 A1 | 11/2018 | Shibata et al. | |
| 2019/0338489 A1 | 11/2019 | Yamanaka et al. | |
| 2022/0178106 A1 * | 6/2022 | Kumagai | E02F 3/435 |
| 2023/0212839 A1 * | 7/2023 | Fujii | E02F 9/26 |
| | | | 701/50 |

FOREIGN PATENT DOCUMENTS

| | | |
|---|---|---|
| JP | H06-336747 A | 12/1994 |
| JP | H09-328785 A | 12/1997 |
| JP | 2001-142506 A | 5/2001 |
| JP | 2005-194825 A | 7/2005 |
| JP | 2015-63864 A | 4/2015 |
| JP | 2016-156193 A | 9/2016 |
| JP | 2017-071982 A | 4/2017 |
| JP | 2018-135679 A | 8/2018 |
| JP | 2018-190241 A | 11/2018 |
| KR | 10-2011-0139344 A | 12/2011 |
| WO | WO-2014/167732 A1 | 10/2014 |
| WO | WO 2016/044263 A1 | 3/2016 |
| WO | WO-2017/010212 A1 | 1/2017 |

\* cited by examiner

SYSTEM INCLUDING WORK MACHINE, COMPUTER IMPLEMENTED METHOD, METHOD FOR PRODUCING TRAINED POSITION ESTIMATION MODEL, AND TRAINING DATA

TECHNICAL FIELD

The present disclosure relates to a system including a work machine, a computer implemented method, a method for producing a trained position estimation model, and training data.

BACKGROUND ART

For a hydraulic excavator, PTL 1 discloses attaching a boom angle sensor to a boom pin, a dipper stick angle sensor to a dipper stick pin, and a bucket angle sensor to a bucket link to sense values which are in turn used to calculate the position of the tip of a tooth of the bucket.

CITATION LIST

Patent Literature

PTL 1: Japanese Patent Laying-Open No. 2017-71982

SUMMARY OF INVENTION

Technical Problem

The configuration described in the above document necessitates attaching an angle sensor to an axis of each of the boom, the dipper stick and the bucket in order to determine the posture of a work implement, which invites an increased number of components.

Herein is disclosed a system including a work machine, a computer implemented method, a method for producing a trained position estimation model, and training data to determine the position of a work implement.

Solution to Problem

According to an aspect of the present disclosure, there is provided a system including a work machine, comprising: a main body of the work machine; a work implement attached to the main body of the work machine; an operating member operated to operate the work implement; and a computer. The computer has a trained position estimation model to determine a position of a target of positional estimation that is a portion of the work implement to be subject to positional estimation. The computer obtains an operation command value causing the work implement to make a movement in response to an operation of the operating member, uses the trained position estimation model to estimate from the operation command value an amount of displacement of the target of positional estimation from a reference position, and outputs a first estimated position that is a position of the target of positional estimation estimated from the reference position and the amount of displacement.

According to an aspect of the disclosure, a computer-implemented method is provided. The method comprises the following steps. A first step is to obtain an operation command value causing a work implement provided to a main body of a work machine to make a movement. A second step is to, using a trained position estimation model for determining a position of the work implement, obtain an estimated position that is a position of the work implement estimated from the operation command value.

According to an aspect of the disclosure, a method for producing a trained position estimation model is provided. The method comprises the following steps. A first step is to obtain training data. The training data includes: an operation command value causing a work implement attached to a main body of a work machine to make a movement; and an amount of displacement of the work implement from a reference position, that is obtained when the operation command value is detected. A second step is to train the position estimation model using the training data.

According to an aspect of the present disclosure, there is provided training data used to train a position estimation model used to determine a position of a work implement. The training data includes: an operation command value causing a work implement attached to a main body of a work machine to make a movement; and an amount of displacement of the work implement from a reference position, that is obtained when the operation command value is detected.

According to an aspect of the disclosure, a method for producing a trained position estimation model is provided. The method comprises the following steps. A first step is to obtain an operation command value causing a work implement attached to a main body of a work machine to make a movement. A second step is to use a trained position estimation model to obtain an estimated position that is a position of the work implement estimated from the operation command value. A third step is to train another position estimation model using training data including the operation command value and the estimated position.

Advantageous Effects of Invention

According to the present disclosure, a position of a work implement can be obtained accurately.

DESCRIPTION OF EMBODIMENTS

Hereinafter, an embodiment will be described with reference to the drawings. In the following description, identical components are identically denoted. Their names and functions are also identical. Accordingly, they will not be described repeatedly.

Figure 1:
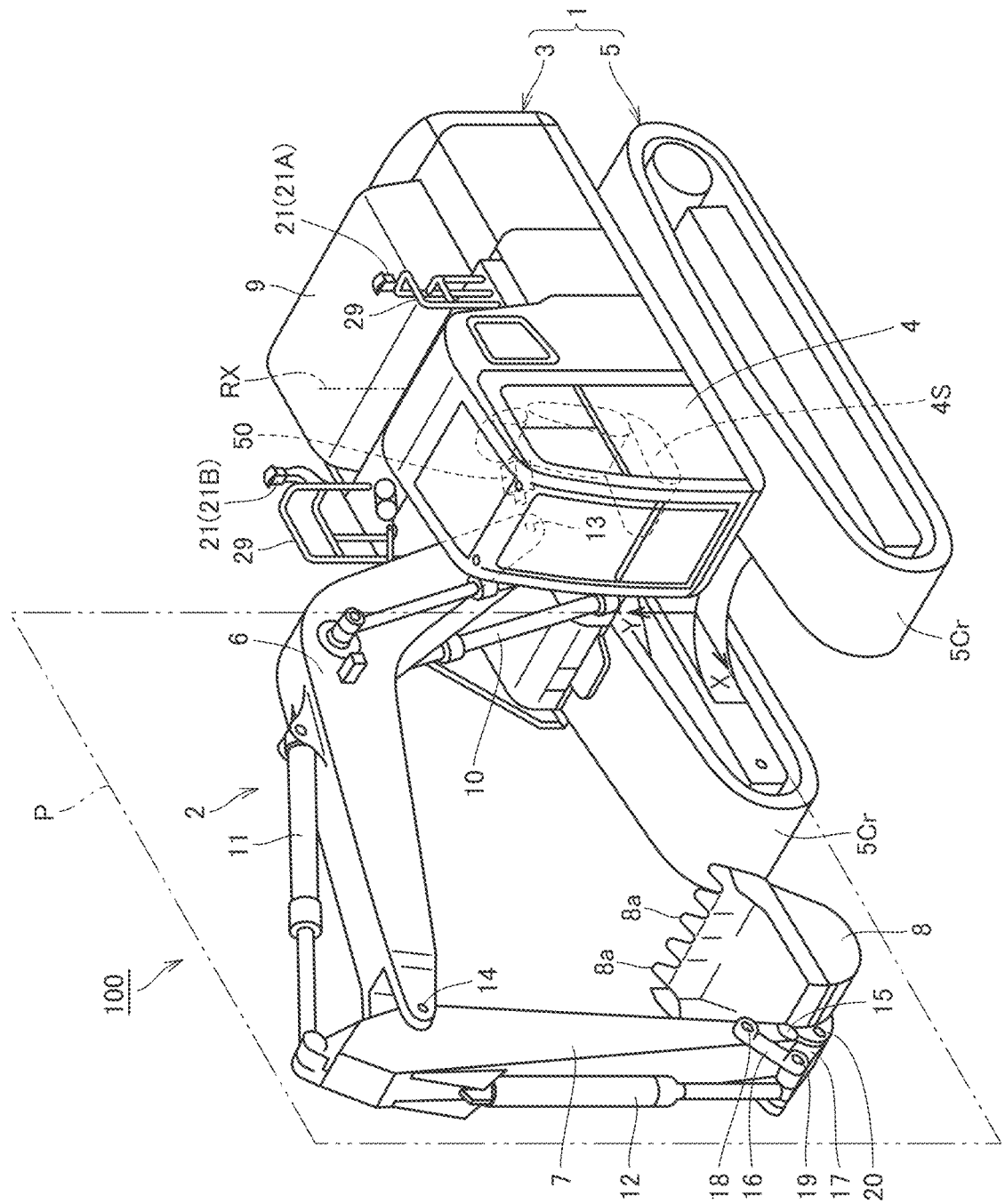
FIG. 1 is an external view of a hydraulic excavator according to an embodiment.

In the embodiment, initially will be described a configuration of a hydraulic excavator which is an example of a work machine to which the idea of the present disclosure is applicable. FIG. 1 shows an appearance of a hydraulic excavator 100 based on an embodiment.

As shown in FIG. 1, hydraulic excavator 100 has a main body 1 and a hydraulically operated work implement 2. Main body 1 has a revolving unit 3 and a traveling apparatus 5. Traveling apparatus 5 has a pair of crawler belts 5Cr. Hydraulic excavator 100 can travel as crawler belts 5Cr rotate. Traveling apparatus 5 may have wheels (tires).

Revolving unit 3 is disposed on traveling apparatus 5 and supported by traveling apparatus 5. Revolving unit 3 can revolve about an axis of revolution RX with respect to traveling apparatus 5. Revolving unit 3 has a cab 4. An occupant (or operator) of hydraulic excavator 100 gets in cab 4 and operates hydraulic excavator 100. Cab 4 is provided with an operator's seat 4S where the operator sits. The operator can operate hydraulic excavator 100 in cab 4. The operator in cab 4 can operate work implement 2, operate revolving unit 3 to revolve it with respect to traveling apparatus 5, and operate traveling apparatus 5 to cause hydraulic excavator 100 to travel.

Revolving unit 3 has an engine compartment 9 accommodating an engine and a counterweight provided in a rear portion of revolving unit 3. In engine compartment 9 are disposed the engine, a hydraulic pump and so forth (not shown).

Revolving unit 3 is provided with a handrail 29 frontwardly of engine compartment 9. Handrail 29 is provided with an antenna 21. Antenna 21 is for example an antenna for GNSS (Global Navigation Satellite Systems). Antenna 21 has a first antenna 21A and a second antenna 21B provided on revolving unit 3 and spaced from each other in a vehicular widthwise direction.

Work implement 2 is supported by revolving unit 3. Work implement 2 has a boom 6, a dipper stick 7, and a bucket 8. Boom 6 is pivotably coupled to revolving unit 3. Dipper stick 7 is pivotably coupled to boom 6. Bucket 8 is pivotably coupled to dipper stick 7. Bucket 8 has a plurality of teeth. Bucket 8 has a distal end portion, which will be referred to as a tooth tip 8a.

Boom 6 has a proximal end portion coupled to revolving unit 3 via a boom pin 13. Dipper stick 7 has a proximal end portion coupled to a distal end portion of boom 6 via a dipper stick pin 14. Bucket 8 is coupled to a distal end portion of dipper stick 7 via a bucket pin 15. Bucket 8 is an example of an attachment detachably attached to a tip of work implement 2. Depending on the type of work, the attachment is replaced with a breaker, grapple, a lifting magnet, or the like.

Hydraulic excavator 100 has a variety of components, and in the present embodiment, their positional relationship will be described with work implement 2 serving as a reference.

Boom 6 of work implement 2 pivots with respect to revolving unit 3 about boom pin 13 provided at the proximal end portion of boom 6. When a specific portion of boom 6 which pivots with respect to revolving unit 3, for example, a distal end portion of boom 6 moves, it provides a locus in an arc. A plane including the arc is specified as an operating plane P. When hydraulic excavator 100 is seen in a plan view, operating plane P is represented as a straight line. The straight line extends in a direction, which is a forward/backward direction of main body 1 of hydraulic excavator 100 or revolving unit 3, and it is hereinafter also simply referred to as the forward/backward direction. A rightward/leftward direction (or vehicular widthwise direction) of main body 1 of hydraulic excavator 100 or a rightward/leftward direction of revolving unit 3 is orthogonal to the forward/backward direction in a plan view, and it is hereinafter also simply referred to as the rightward/leftward direction.

A side where work implement 2 protrudes from main body 1 of hydraulic excavator 100 in the forward/backward direction is the forward direction and a direction opposite to the forward direction is the backward direction. A right side and a left side of the rightward/leftward direction when one faces front are the rightward direction and the leftward direction, respectively.

The forward/backward direction refers to a forward/backward direction of an operator who sits at the operator's seat in cab 4. A direction in which the operator sitting at the operator's seat faces is defined as the forward direction and a direction behind the operator who sits at the operator's seat is defined as the backward direction. The rightward/leftward direction refers to a rightward/leftward direction of the operator who sits at the operator's seat. A right side and a left side when the operator sitting at the operator's seat faces front are defined as the rightward direction and the leftward direction, respectively.

Boom 6 is pivotable about boom pin 13. Dipper stick 7 is pivotable about dipper stick pin 14. Bucket 8 is pivotable about bucket pin 15. Dipper stick 7 and bucket 8 are each a movable member movable on the side of the distal end of boom 6. Boom pin 13, dipper stick pin 14, and bucket pin 15 extend in a direction orthogonal to operating plane P, i.e., in the rightward/leftward direction. Operating plane P is orthogonal to at least one (in the embodiment, all three) of axes that serve as centers about which boom 6, dipper stick 7, and bucket 8 pivot.

As has been set forth above, boom 6 pivots on operating plane P with respect to revolving unit 3. Similarly, dipper stick 7 pivots on operating plane P with respect to boom 6, and bucket 8 pivots on operating plane P with respect to dipper stick 7. Work implement 2 of the embodiment has its entirety operated on operating plane P. Tooth tip 8a of bucket 8 moves on operating plane P. Operating plane P is a vertical plane including a range in which work implement 2 is movable. Operating plane P intersects each of boom 6, dipper stick 7, and bucket 8. Operating plane P can be set at a center of boom 6, dipper stick 7, and bucket 8 in the rightward/leftward direction.

As shown in FIG. 1, in the present specification, an X axis is set in a horizontal direction on operating plane P and a Y axis is set in a vertically upward direction on operating plane P. The X axis and the Y axis are orthogonal to each other.

Work implement 2 has a boom cylinder 10, a dipper stick cylinder 11, and a bucket cylinder 12. Boom cylinder 10 drives boom 6. Dipper stick cylinder 11 drives dipper stick 7. Bucket cylinder 12 drives bucket 8. Boom cylinder 10, dipper stick cylinder 11, and bucket cylinder 12 are each a hydraulic cylinder driven with hydraulic oil.

Work implement 2 has a bucket link. The bucket link has a first link member 16 and a second link member 17. First link member 16 and second link member 17 have their respective tips relatively rotatably coupled together via a bucket cylinder top pin 19. Bucket cylinder top pin 19 is coupled to a tip of bucket cylinder 12. Therefore, first link member 16 and second link member 17 are pinned to bucket cylinder 12.

First link member 16 has a proximal end rotatably coupled to dipper stick 7 via a first link pin 18 in a vicinity of bucket pin 15 located at the distal end portion of dipper stick 7. First link member 16 is pinned to dipper stick 7. Second link member 17 has a proximal end rotatably coupled via a second link pin 20 to a bracket located at a foot of bucket 8. Second link member 17 is pinned to bucket 8.

Hydraulic excavator 100 has an imaging device 50. Imaging device 50 in the embodiment is a monocular camera.

Imaging device 50 is attached to revolving unit 3. Imaging device 50 is attached to cab 4. Imaging device 50 is attached inside cab 4. Imaging device 50 is attached in a vicinity of an upper end of a left front pillar of cab 4. Imaging device 50 is disposed in an internal space of cab 4 in a vicinity of the left front pillar at a position away from work implement 2 in the rightward/leftward direction. Imaging device 50 is disposed apart from operating plane P of work implement 2 in the rightward/leftward direction. Imaging device 50 is disposed leftwardly of operating plane P.

Figure 2:
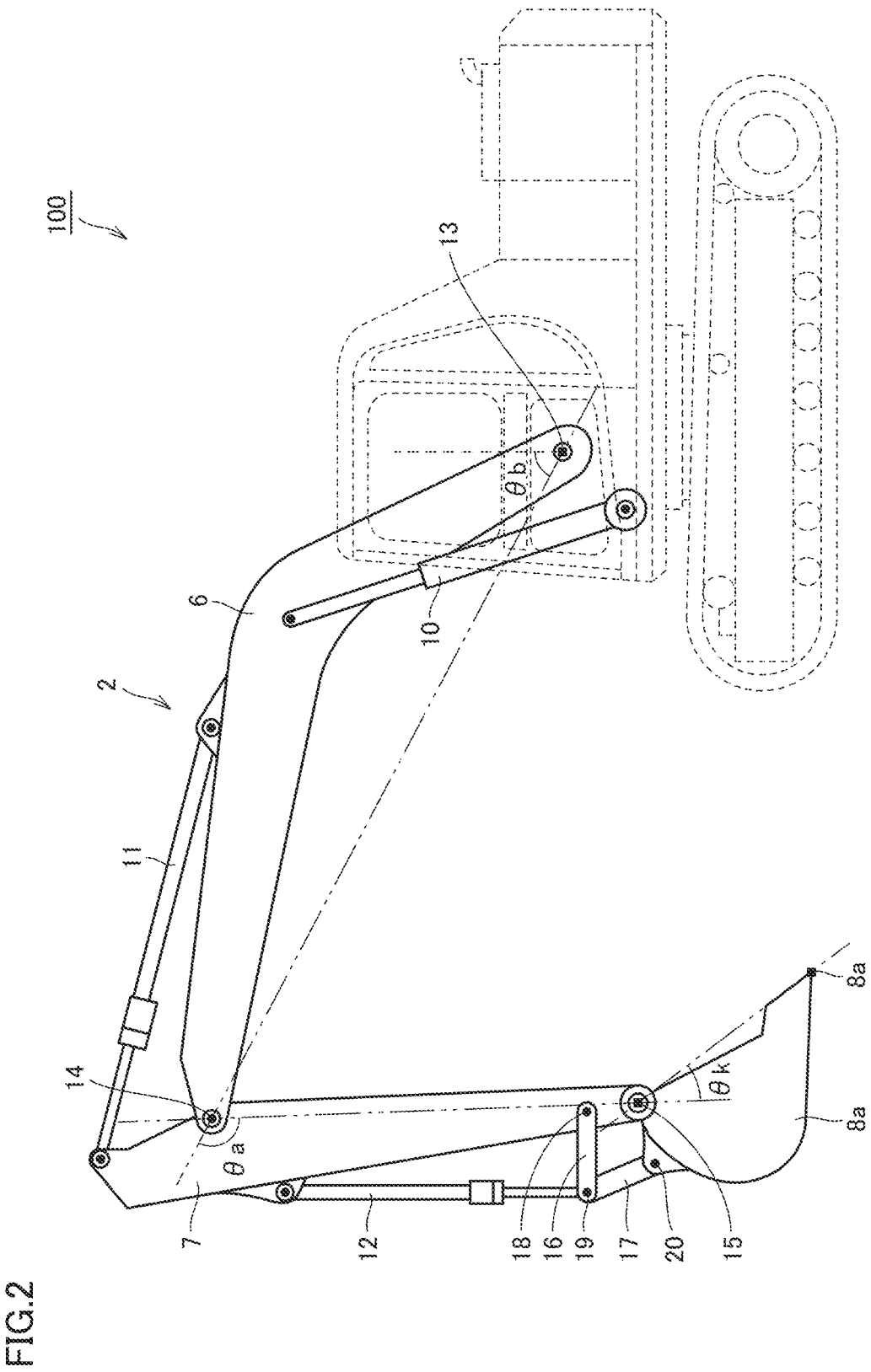
FIG. 2 is a side view of a work implement for illustrating a boom angle, a dipper stick angle, and a bucket angle.

FIG. 2 is a side view of work implement 2 for illustrating a boom angle θb, a dipper stick angle θa, and a bucket angle θk.

As shown in FIG. 2, an angle formed in a side view by a straight line passing through boom pin 13 and dipper stick pin 14 and a straight line extending in an upward/downward direction is defined as boom angle θb. Boom angle θb is an angle of boom 6 with respect to revolving unit 3.

An angle formed in a side view by a straight line passing through boom pin 13 and dipper stick pin 14 and a straight line passing through dipper stick pin 14 and bucket pin 15 is defined as dipper stick angle θa. Dipper stick angle θa is an angle of dipper stick 7 with respect to boom 6.

An angle formed in a side view by a straight line passing through dipper stick pin 14 and bucket pin 15 and a straight line passing through bucket pin 15 and tooth tip 8a is defined as bucket angle θk. Bucket angle θk is an angle of bucket 8 with respect to dipper stick 7.

A posture of work implement 2 on operating plane P is determined by a combination of boom angle θb, dipper stick angle θa, and bucket angle θk. For example, a position, or XY coordinates, on operating plane P of first link pin 18 located at the distal end portion of dipper stick 7 is determined by a combination of boom angle θb and dipper stick angle θa. A position, or XY coordinates, on operating plane P of bucket cylinder top pin 19 displacing as bucket 8 operates is determined by a combination of boom angle θb, dipper stick angle θa, and bucket angle θk.

Figure 3:
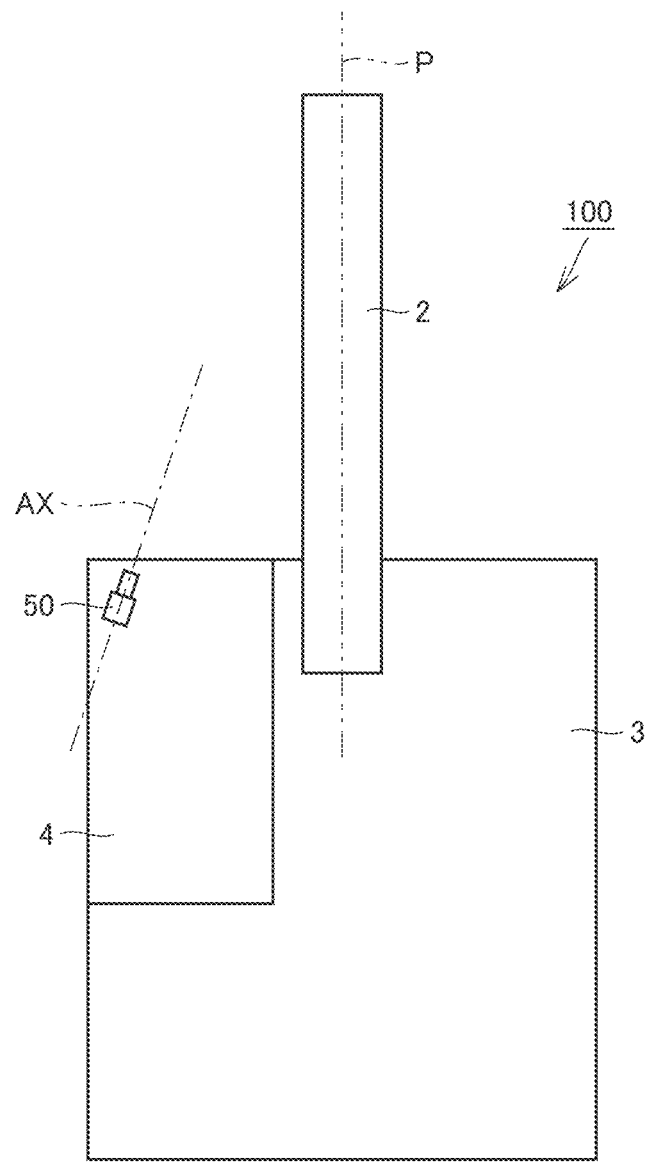
FIG. 3 is a schematic plan view of the hydraulic excavator shown in FIG. 1.

FIG. 3 is a schematic plan view of hydraulic excavator 100 shown in FIG. 1. FIG. 3 schematically illustrates work implement 2, revolving unit 3, cab 4, and imaging device 50 described with reference to FIG. 1. Operating plane P in FIG. 3 is represented as a straight line extending in the upward/downward direction in the figure, and is indicated by a chain double-dashed line. An optical axis AX indicated by a dot-dashed line in FIG. 3 is an optical axis of imaging device 50. Optical axis AX and operating plane P do not extend in parallel. Optical axis AX extends in a direction inclined with respect to that in which operating plane P extends. Optical axis AX intersects operating plane P.

Imaging device 50 is attached at a position at which the operating plane of work implement 2 is viewed in an oblique direction. Imaging device 50 captures an image of work implement 2 at an angle larger than 0° with respect to operating plane P. Work implement 2 and imaging device 50 are both attached to revolving unit 3, and even when hydraulic excavator 100 travels or revolves, imaging device 50 has a positional relationship unchanged with respect to operating plane P. A position at which imaging device 50 is attached with respect to operating plane P is predetermined for each type of hydraulic excavator 100.

Imaging device 50 captures an image of work implement 2. Imaging device 50 images operating plane P of work implement 2. Imaging device 50 captures an image of work implement 2 moving on operating plane P. The image captured by imaging device 50 includes at least a portion of work implement 2.

Figure 4:
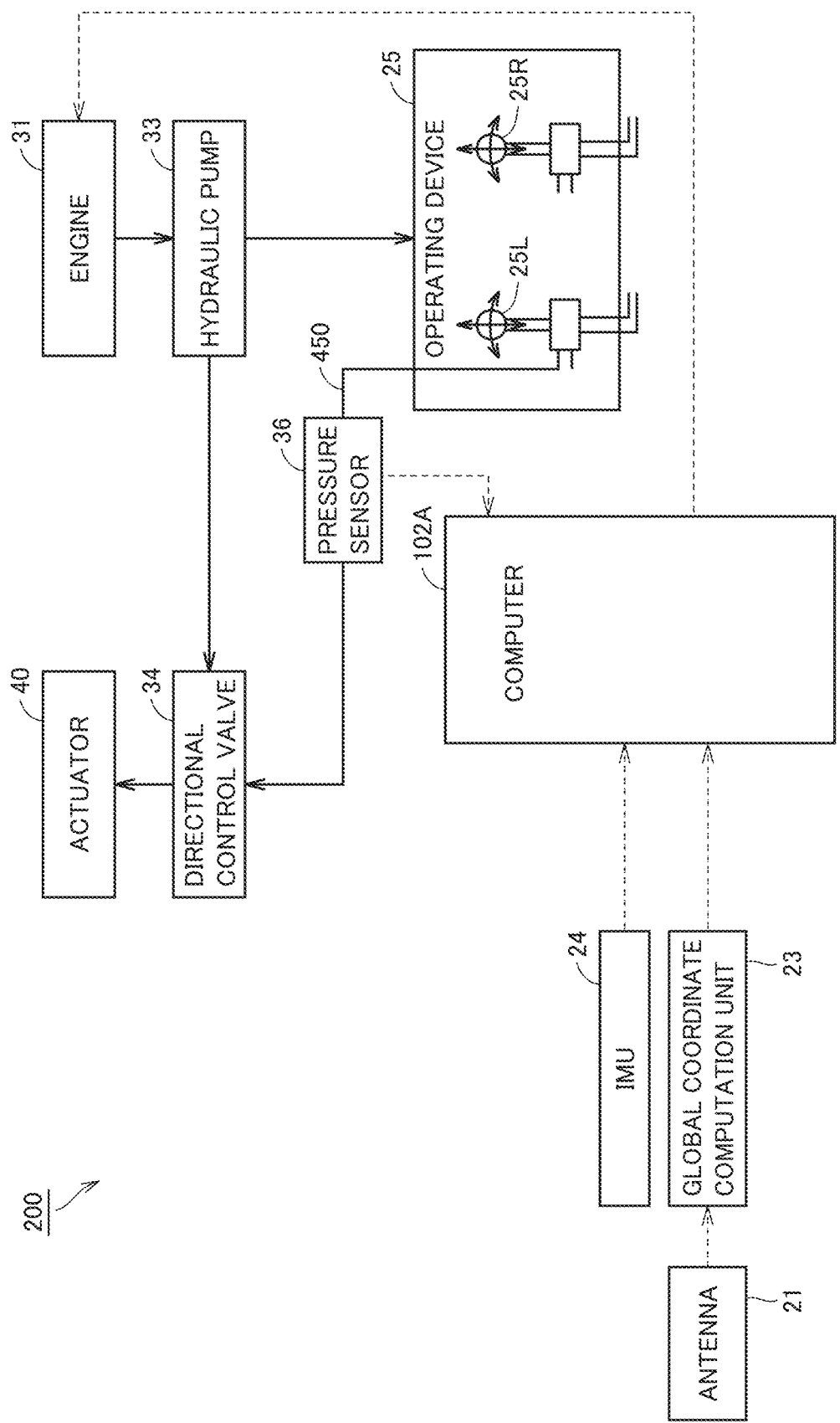
FIG. 4 is a block diagram showing a schematic configuration of a system including the hydraulic excavator.

FIG. 4 is a block diagram showing a schematic configuration of the system including hydraulic excavator 100. The system according to the embodiment is a system for determining a relative position of work implement 2 relative to the main body of the work machine (main body 1). The system according to the embodiment includes hydraulic excavator 100 as an example of the work machine described with reference to FIGS. 1 to 3, and a control device 200 shown in FIG. 4. Control device 200 may be mounted in hydraulic excavator 100.

Control device 200 includes an antenna 21, a global coordinate computation unit 23, an IMU (Inertial Measurement Unit) 24, an operating device 25, a directional control valve 34, a pressure sensor 36, and a computer 102A.

Antenna 21 outputs to global coordinate computation unit 23 a signal corresponding to a received radio wave (a GNSS radio wave). Global coordinate computation unit 23 detects in a global coordinate system a position of antenna 21 as installed. The global coordinate system is a three-dimensional coordinate system based on a reference position introduced in a work area. The reference position may be the position of the tip of a reference stake set in the work area.

IMU 24 is provided at revolving unit 3. In this example, IMU 24 is disposed under cab 4. Revolving unit 3 is provided with a frame having high rigidity under cab 4. IMU 24 is disposed on the frame. IMU 24 may be disposed sideway (on a right or left side) of axis of revolution RX of revolving unit 3. IMU 24 measures the acceleration of revolving unit 3 in the forward/backward direction, the rightward/leftward direction and the upward/downward direction, and the angular velocity of revolving unit 3 about the forward/backward direction, the rightward/leftward direction and the upward/downward direction.

Operating device 25 is disposed in cab 4. An operator operates operating device 25. Operating device 25 receives an operation done by the operator to drive work implement 2. Operating device 25 receives an operation done by the operator to revolve revolving unit 3. Operating device 25 outputs an operation signal corresponding to an operation done by the operator. In this example, operating device 25 is an operating device in a pilot hydraulic system.

Control device 200 is configured such that hydraulic oil discharged by hydraulic pump 33 as it is driven by engine 31 is supplied to a variety of types of hydraulic actuators 40 via directional control valve 34 in response to an operation of operating device 25 by the operator. Operation of work implement 2, revolution of revolving unit 3, and traveling operation of traveling apparatus 5 are controlled by controlling the hydraulic pressure supplied to and output from hydraulic actuator 40. Hydraulic actuator 40 includes boom cylinder 10, dipper stick cylinder 11 and bucket cylinder 12 shown in FIG. 1, and a slewing motor (not shown).

Engine 31 is a diesel engine. The amount of fuel injected into engine 31 is controlled by computer 102A to control output of engine 31.

Hydraulic pump 33 is coupled with engine 31. Hydraulic pump 33 is driven when rotational driving force of engine 31 is transmitted to hydraulic pump 33. Hydraulic pump 33 is a hydraulic pump of a variable displacement type having a swash plate with a tilting angle changed to change displacement. Hydraulic pump 33 discharges hydraulic oil which is in turn reduced in pressure to a predetermined pressure by a reducing valve and thus supplied to directional control valve 34.

Directional control valve 34 is a spool valve that moves a rod-shaped spool to switch a direction in which the hydraulic oil flows. As the spool moves in the axial direction, an amount of hydraulic oil supplied to hydraulic actuator 40 is regulated. Directional control valve 34 is provided with a spool stroke sensor to sense a distance by which the spool moves (i.e., a spool stroke).

In this example, the oil supplied to hydraulic actuator 40 in order to actuate hydraulic actuator 40 is referred to as hydraulic oil. The oil supplied to directional control valve 34 to actuate directional control valve 34 is referred to as pilot oil. The pressure of the pilot oil is referred to as hydraulic pilot pressure.

Hydraulic pump 33 may deliver both hydraulic oil and pilot oil. For example, some of the hydraulic oil delivered from hydraulic pump 33 may be reduced in pressure by a reducing valve, and the hydraulic oil thus reduced in pressure may be used as pilot oil. Hydraulic pump 33 may include a hydraulic pump for delivering hydraulic oil (a main hydraulic pump) and a hydraulic pump for delivering pilot oil (a pilot hydraulic pump) separately.

Operating device 25 has a first control lever 25R and a second control lever 25L. First control lever 25R is disposed on the right side of the operator's seat 4S, for example. Second control lever 25L is disposed on the left side of the operator's seat 4S, for example. For first and second control levers 25R and 25L, forward, backward, leftward, and rightward movements corresponds to movements along two axes.

Boom 6 and bucket 8 are controlled via first control lever 25R. Operation of first control lever 25R in the forward/backward direction corresponds to operation of boom 6, and in response to the operation in the forward/backward direction, upward movement of boom 6 and downward movement of boom 6 are performed. Operation of first control lever 25R in the rightward/leftward direction corresponds to operation of bucket 8, and in response to the operation in the rightward/leftward direction, movement of bucket 8 in the upward/downward direction is performed.

Dipper stick 7 and revolving unit 3 are controlled via second control lever 25L. Operation of second control lever 25L in the forward/backward direction corresponds to operation of dipper stick 7, and in response to the operation in the forward/backward direction, movement of dipper stick 7 in the upward/downward direction is performed. Operation of second control lever 25L in the rightward/leftward direction corresponds to revolution of revolving unit 3, and in response to the operation in the rightward/leftward direction, clockwise/counterclockwise movement of revolving unit 3 is performed.

In this example, upward movement of boom 6 is also referred to as an ascending movement, and downward movement of boom 6 is also referred to as a descending movement. Movements of dipper stick 7 in the upward/downward directions are also referred to as a dumping movement and an excavating movement, respectively. Movements of bucket 8 in the upward/downward directions are also referred to as a dumping movement and an excavating movement, respectively.

Operation of first control lever 25R in the rightward/leftward direction may correspond to operation of boom 6, and operation of first control lever 25R in the forward/backward direction may correspond to operation of bucket 8. Operation of second control lever 25L in the forward/backward direction may correspond to operation of revolving unit 3, and operation of second control lever 25L in the rightward/leftward direction may correspond to operation of dipper stick 7.

First and second control levers 25R and 25L correspond to an operating member in the embodiment.

The pilot oil delivered from hydraulic pump 33 and reduced in pressure by the reducing valve is supplied to operating device 25.

Operating device 25 and directional control valve 34 are interconnected via a pilot oil channel 450. Hydraulic pilot pressure is regulated based on how operating device 25 is operated. When operating device 25 is operated, the hydraulic pilot pressure corresponding to how operating device 25 is operated is supplied to directional control valve 34 via pilot oil channel 450. Thus, directional control valve 34 is controlled to regulate in which direction the hydraulic oil supplied to boom cylinder 10, dipper stick cylinder 11 and bucket cylinder 12 flows and the hydraulic oil's flow rate to thus provide movement of boom 6, dipper stick 7 and bucket 8 in the upward/downward direction.

Pilot oil channel 450 is provided with pressure sensor 36. Pressure sensor 36 senses hydraulic pilot pressure. A result of sensing by pressure sensor 36 is output to computer 102A. Hydraulic pilot pressure (PPC pressure) regulated through operation of operating device 25 and sensed by pressure sensor 36 corresponds to the operation command value in the embodiment.

Although simplified in FIG. 4, a plurality of pilot oil channels 450 corresponding to operations of first and second control levers 25R and 25L in the forward, backward, rightward, and leftward directions are provided to interconnect operating device 25 and directional control valve 34. Pressure sensor 36 is disposed for each of the plurality of pilot oil channels 450. For example, when bucket 8 is moved, pressure sensor 36 that senses an increase in hydraulic pilot pressure when bucket 8 is caused to make the dumping movement is different from pressure sensor 36 that senses an increase in hydraulic pilot pressure when bucket 8 is caused to make the excavating movement. In how much amount the hydraulic pilot pressure is increased varies depending on at what angle the control lever is tilted from the neutral position. In this way, how operating device 25 is operated can be determined based on a result of sensing hydraulic pilot pressure by each pressure sensor 36.

Figure 5:
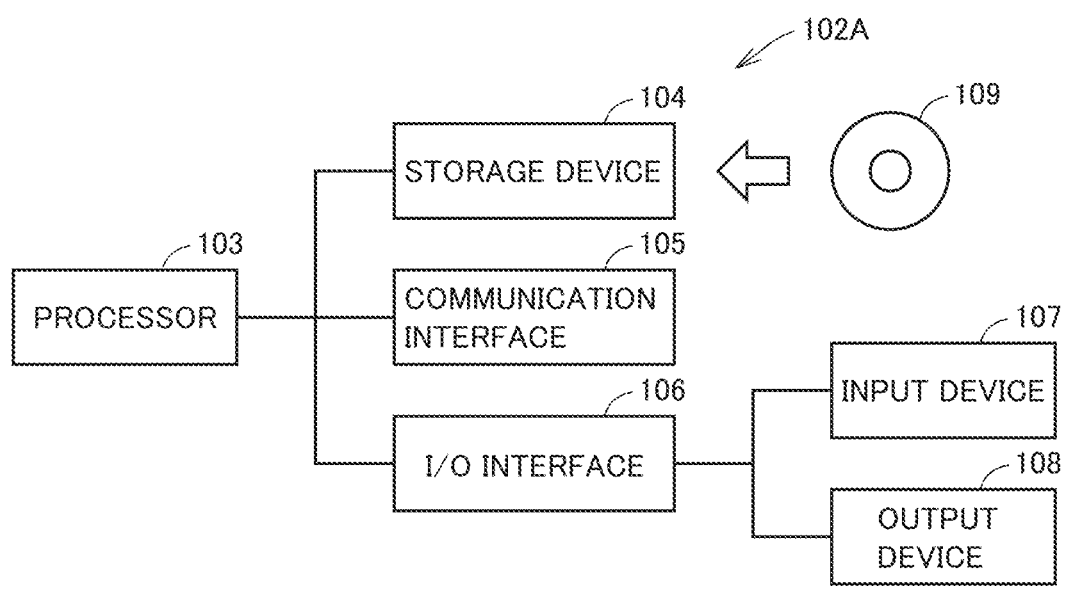
FIG. 5 is a schematic diagram showing a configuration of a computer.

FIG. 5 is a schematic diagram showing a configuration of a computer 102A. Computer 102A may be designed exclusively for the system according to the embodiment, or may be a general-purpose PC (Personal Computer). Computer 102A has a processor 103, a storage device 104, a communication interface 105, and an I/O interface 106. Processor 103 is, for example, a CPU (Central Processing Unit).

Storage device 104 includes a medium that stores information such as stored programs and data readably by processor 103. Storage device 104 includes a system memory such as a RAM (Random Access Memory) or a ROM (Read Only Memory), and an auxiliary storage device. The auxiliary storage device may be a magnetic storage medium such as a hard disk, an optical storage medium such as a CD (Compact Disc) and a DVD (Digital Versatile Disc), or a semiconductor memory such as a flash memory. Storage device 104 may be incorporated in computer 102A. Storage device 104 may include an external storage medium 109 that is detachably connected to computer 102A. External storage medium 109 may be a CD-ROM.

Communication interface 105 is, for example, a wired LAN (Local Area Network) module or a wireless LAN module, and is an interface for performing communications via a communication network. I/O interface 106 is, for example, a USB (Universal Serial Bus) port, and is an interface for connecting to an external device.

Computer 102A is connected to input device 107 and output device 108 via I/O interface 106. Input device 107 is a device for a user to input to computer 102A. Input device 107 includes a pointing device such as a mouse or a trackball, for example. Input device 107 may include a device such as a keyboard used to input text. Output device 108 includes, for example, a display.

Figure 6:
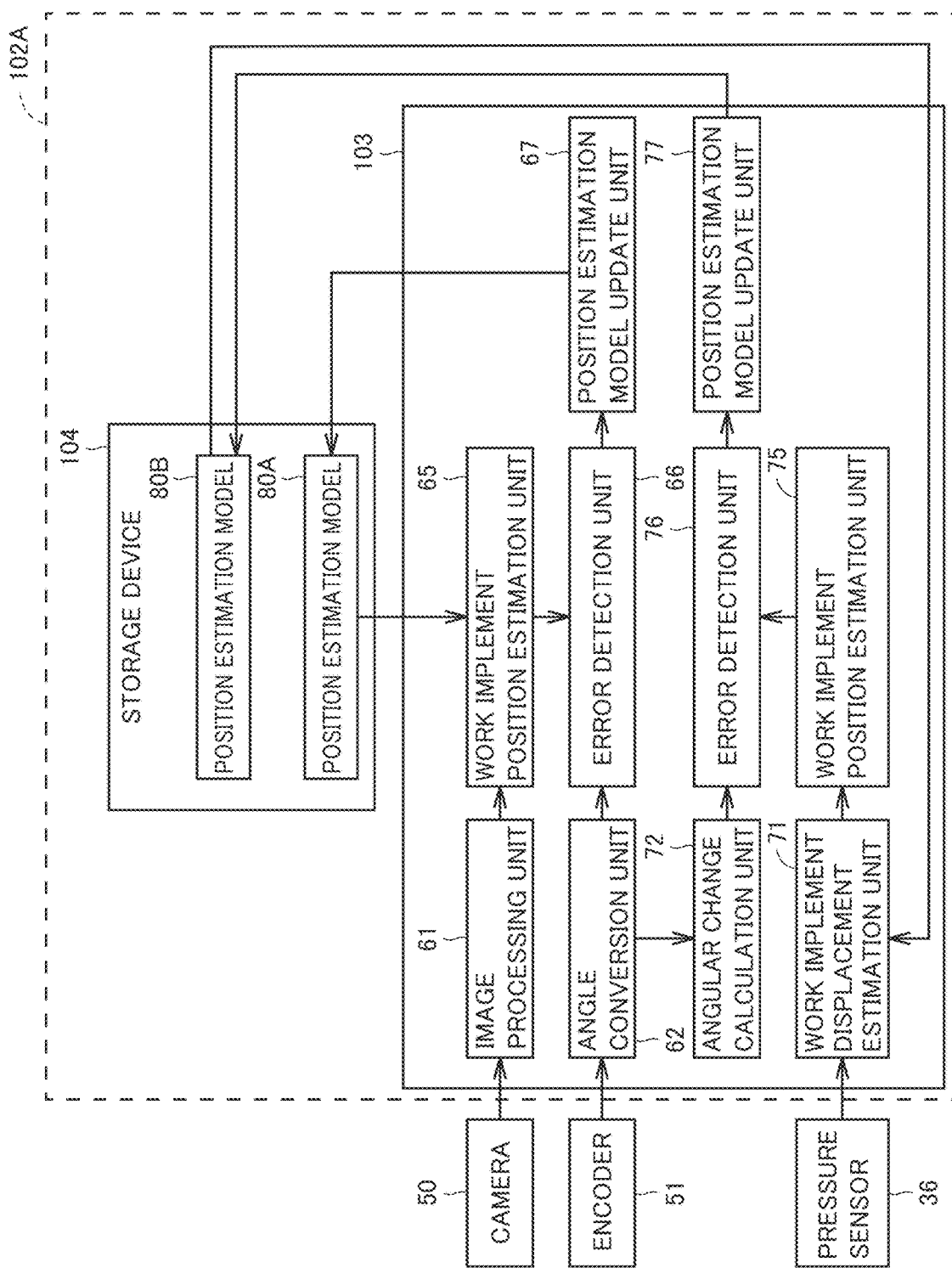
FIG. 6 is a functional block diagram generally showing an internal configuration of the computer before shipment.

FIG. 6 is a functional block diagram generally showing an internal configuration of computer 102A before shipment. Processor 103 and storage device 104 shown in FIG. 6 constitute a part of the configuration of computer 102A shown in FIG. 5.

Processor 103 includes an image processing unit 61 and a work implement position estimation unit 65. Image processing unit 61 receives from an imaging device (a camera) 50 an input of a captured image captured by imaging device 50. Image processing unit 61 subjects the received, captured image to image processing.

Storage device 104 stores a position estimation model 80A (a first position estimation model) trained and a position estimation model 80B (a second position estimation model) trained. Position estimation models 80A and 80B are artificial intelligence models for determining a relative position of work implement 2 relative to main body 1. Computer 102A uses the artificial intelligence position estimation model to estimate the relative position of work implement 2. Position estimation models 80A and 80B include a neural network. Position estimation models 80A and 80B include, for example, a deep neural networks such as a convolutional neural network (CNN).

The model in the embodiment may be implemented in hardware, software executable on hardware, firmware, or a combination thereof. The model may include programs, algorithms, and data executed by processor 103. The model may have functionality performed by a single module or across multiple modules in a distributed manner. The model may be distributed across a plurality of computers.

Position estimation model 80A is configured to determine a relative position of work implement 2 from a captured image. Work implement position estimation unit 65 uses position estimation model 80A to estimate a relative position of work implement 2 from a captured image to obtain an estimated position. More specifically, work implement position estimation unit 65 reads position estimation model 80A from storage device 104 and inputs the captured image to position estimation model 80A to obtain an output of a result of estimation of boom angle $\theta b$, dipper stick angle $\theta a$, and bucket angle $\theta k$. An estimated position of work implement 2 obtained from a captured image corresponds to a second estimated position in the embodiment.

Work implement position estimation unit 65 also outputs accuracy of a result of estimation, that is, at what probability in % the current boom angle $\theta b$, dipper stick angle $\theta a$ and bucket angle $\theta k$ can be estimated based on a captured image. If the captured image is clear and clearly captures boom 6, dipper stick 7 and bucket 8, the result of estimation has higher accuracy. If there is disturbance, such as a part of work implement 2 being hidden in soil, an image being captured against the light, or cab 4 having a dirty window, and the captured image fails to capture a clear image of any of boom 6, dipper stick 7 and bucket 8, the position of that unclear portion will be estimated with reduced accuracy.

Processor 103 further includes a work implement displacement estimation unit 71 and a work implement position estimation unit 75.

Work implement displacement estimation unit 71 receives from pressure sensor 36 an input of hydraulic pilot pressure sensed by pressure sensor 36. Position estimation model 80B is configured to determine an amount of displacement of work implement 2 from the hydraulic pilot pressure. Using position estimation model 80B, work implement displacement estimation unit 71 determines from the received hydraulic pilot pressure how operating device 25 is operated.

More specifically, work implement displacement estimation unit 71 reads position estimation model 80B from storage device 104 and inputs hydraulic pilot pressure to position estimation model 80B to determine how operating device 25 is operated. Based on a period of time having elapsed since a process for determining how operating device 25 is operated was immediately previously performed, and how operating device 25 was operated, as determined through the process when it was immediately previously performed, and how operating device 25 is operated, as determined through the process when it is currently performed, work implement displacement estimation unit 71 obtains an output of an estimated amount of displacement of work implement 2 indicating how much work implement 2 has moved between a point in time at which the process was immediately previously performed and the current point in time.

Work implement position estimation unit 75 estimates the current position of work implement 2. Specifically, work implement position estimation unit 75 reads from storage device 104 a reference position for work implement 2 and a point in time at which work implement 2 is estimated to be at the reference position. Work implement position estimation unit 75 estimates an amount of displacement of work implement 2 from the reference position by adding from the point in time at which work implement 2 is estimated to be at the reference position a result of estimation of an amount of displacement of work implement 2 that is output by work implement displacement estimation unit 71. Then, work implement position estimation unit 75 obtains an output of an estimated current position of work implement 2 estimated from the reference position for work implement 2 and the amount of displacement of work implement 2 from the reference position. The estimated position of work implement 2 obtained from the reference position for work implement 2 and the amount of displacement of work implement 2 from the reference position corresponds to a first estimated position in the embodiment.

The reference position for work implement 2 can for example be a position of work implement 2, as estimated by position estimation model 80A, that is assumed immediately before accuracy of estimation in estimating a position of work implement 2 from a captured image through position estimation model 80A falls below a predetermined value.

Of boom 6, dipper stick 7, and bucket 8 constituting work implement 2, a portion to be subject to positional estimation using position estimation model 80B is referred to as a target of positional estimation. For example, when work implement 2 is excavating soil and bucket 8 has tooth tip 8a hidden in the soil and no longer included in a captured image, computer 102A sets bucket 8 as a target of positional estimation.

When the target of positional estimation is bucket 8, work implement displacement estimation unit 71 determines from hydraulic pilot pressure a tilt angle of first control lever 25R from the neutral position in the rightward or leftward direction for causing bucket 8 to make the dumping movement or the excavating movement. Based on a period of time having elapsed since a process for determining a tilt angle of first control lever 25R was immediately previously performed, and a tilt angle of first control lever 25R as determined through the process when it was immediately previously performed and a tilt angle of first control lever 25R as determined through the process when it is currently performed, work implement displacement estimation unit 71 obtains an output of a result of estimation of an amount of change of bucket angle $\theta k$ between a point in time at which the process was immediately previously performed and the current point in time. Work implement position estimation unit 75 adds the amount of change of bucket angle $\theta k$ from bucket angle $\theta k$ at the reference position to bucket angle $\theta k$ at the reference position and outputs an estimated position that is an estimated bucket angle $\theta k$ indicating the current position of bucket 8.

When the target of positional estimation is bucket 8, and boom angle $\theta b$ and dipper stick angle $\theta a$ indicating positions of portions of work implement 2 other than the target of positional estimation (in this case, the positions of boom 6 and dipper stick 7) can be estimated from a captured image through position estimation model 80A with high accuracy, an estimated position of work implement 2 can be obtained from boom angle $\theta b$ and dipper stick angle $\theta a$ estimated through position estimation model 80A and bucket angle $\theta k$ estimated through position estimation model 80B.

When the target of positional estimation is bucket 8, boom angle $\theta b$ and dipper stick angle $\theta a$ indicating positions of portions of work implement 2 other than the target of positional estimation (in this case, the positions of boom 6 and dipper stick 7) may further be estimated through position estimation model 80B.

Hydraulic excavator 100 before shipment further includes an encoder 51. Encoder 51 is a general term for a boom angle sensor attached to boom pin 13, a dipper stick angle sensor attached to the dipper stick pin, and a bucket angle sensor attached to the bucket link. Instead of encoder 51, a potentiometer may be attached to work implement 2 to measure an angle. A stroke sensor that senses the stroke of the hydraulic cylinder may be attached to convert an amount of movement of the hydraulic cylinder into an angle.

Processor 103 has an angle conversion unit 62. Angle conversion unit 62 receives an electrical signal from encoder 51 and converts the electrical signal into boom angle $\theta b$, dipper stick angle $\theta a$, and bucket angle $\theta k$. Encoder 51 obtains an electrical signal at a time when imaging device 50 captures an image, and outputs the electrical signal to angle conversion unit 62. Angle conversion unit 62 associates boom angle $\theta b$, dipper stick angle $\theta a$ and bucket angle $\theta k$ that are measured when imaging device 50 captures the image with the captured image, and thus obtains the angles.

Processor 103 has an error detection unit 66. Error detection unit 66 compares a result of an estimation of boom angle $\theta b$, dipper stick angle $\theta a$ and bucket angle $\theta k$ by work implement position estimation unit 65 with a result of a measurement of boom angle $\theta b$, dipper stick angle $\theta a$ and bucket angle $\theta k$ obtained by angle conversion unit 62. Error detection unit 66 calculates an error of the result of the estimation with respect to the true values of boom angle $\theta b$, dipper stick angle $\theta a$ and bucket angle $\theta k$.

Processor 103 has a position estimation model update unit 67. Position estimation model update unit 67 updates position estimation model 80A based on the error of boom angle $\theta b$, dipper stick angle $\theta a$ and bucket angle $\theta k$ as calculated by error detection unit 66. In this way, position estimation model 80A is trained. An image of work implement 2 captured by imaging device 50, and boom angle $\theta b$, dipper stick angle $\theta a$ and bucket angle $\theta k$ obtained when the image is captured, as calculated in angle conversion unit 62, configure data for training position estimation model 80A. Position estimation model 80A is trained in a factory before hydraulic excavator 100 is shipped.

Processor 103 includes an angular change calculation unit 72. Angular change calculation unit 72 obtains amounts of changes of boom angle $\theta b$, dipper stick angle $\theta a$ and bucket angle $\theta k$ based on boom angle $\theta b$, dipper stick angle $\theta a$ and bucket angle $\theta k$ obtained by angle conversion unit 62 and a point in time at which the angles are obtained by angle conversion unit 62. Angular change calculation unit 72 obtains the current position of work implement 2 from boom angle $\theta b$, dipper stick angle $\theta a$ and bucket angle $\theta k$ of work implement 2 at the reference position and the amounts of changes of boom angle $\theta b$, dipper stick angle $\theta a$ and bucket angle $\theta k$.

Processor 103 includes an error detection unit 76. Error detection unit 76 compares a result of estimation of the position of work implement 2 by work implement position estimation unit 75 with the current position of work implement 2 as obtained by angular change calculation unit 72. Error detection unit 76 calculates an error of the result of estimation with respect to true values of boom angle $\theta b$, dipper stick angle $\theta a$ and bucket angle $\theta k$.

Processor 103 includes a position estimation model update unit 77. Position estimation model update unit 77 updates position estimation model 80B based on errors of boom angle $\theta b$, dipper stick angle $\theta a$ and bucket angle $\theta k$ as calculated by error detection unit 66. In this way, position estimation model 80B is trained. The operation command value causing the work implement to make a movement based on operation of operating device 25, as represented by hydraulic pilot pressure sensed by pressure sensor 36, and the amount of displacement of work implement 2 from the reference position when the operation command value is detected, as calculated by angular change calculation unit 72, configure training data for training position estimation model 80B. Position estimation model 80B is trained in a factory before shipment of hydraulic excavator 100.

Figure 7:
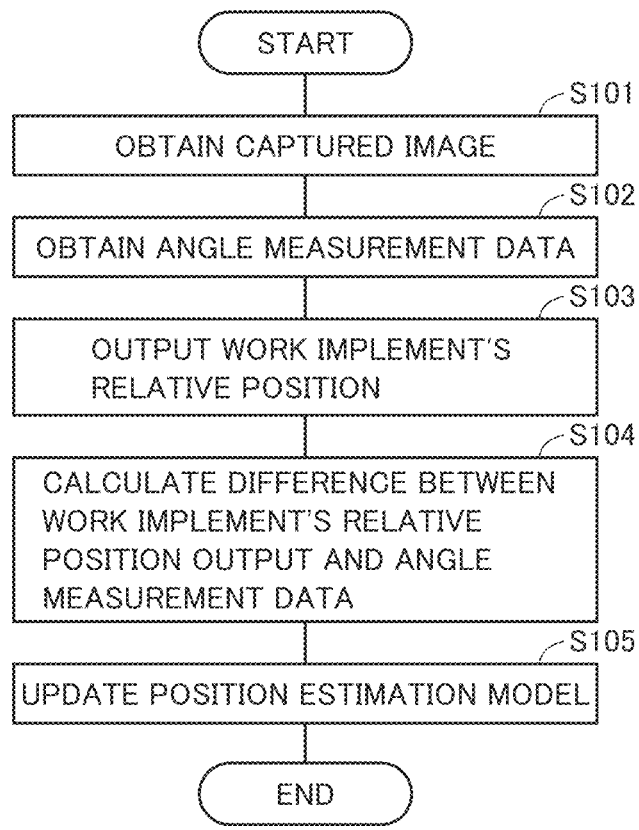
FIG. 7 is a flowchart of a method for producing a first position estimation model trained.
Figure 8:
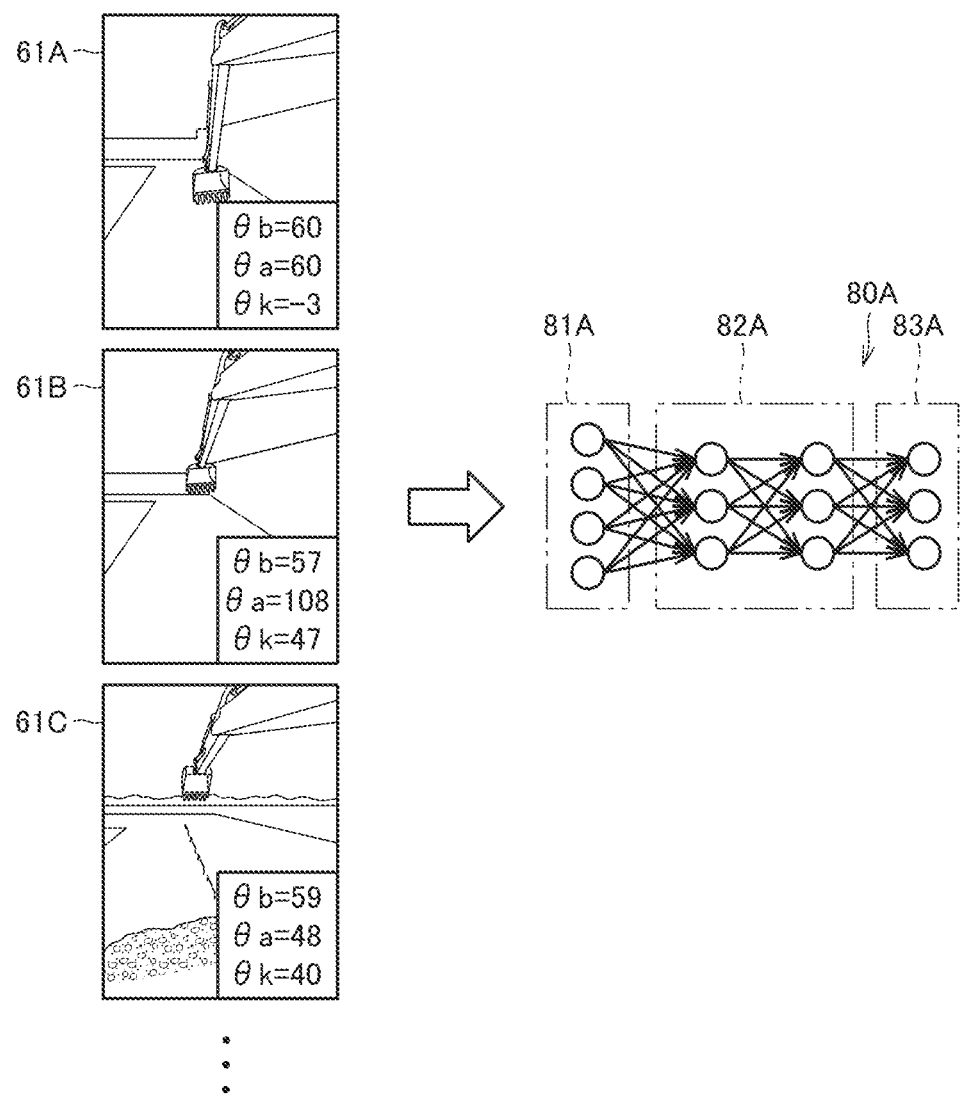
FIG. 8 is a schematic diagram showing a process for training the first position estimation model.

FIG. 7 is a flowchart of a method for producing a first position estimation model trained. FIG. 8 is a schematic diagram for illustrating a process for training the first position estimation model. Although there is some overlapping with the contents described with reference to FIG. 6, a process for training position estimation model 80A (the first position estimation model) for estimating a position of work implement 2 relative to main body 1 will now be described below with reference to FIGS. 7 and 8.

As shown in FIG. 7, initially, in step S101, a captured image is obtained. Computer 102A, more specifically, image processing unit 61, obtains from imaging device (or a camera) 50 an image captured by imaging device 50. The captured image is timestamped so that when the image is captured can be determined. Image processing unit 61 may obtain in real time an image captured by imaging device 50. Image processing unit 61 may obtain a captured image from imaging device 50 at a prescribed time or whenever a prescribed period of time elapses. Image processing unit 61 subjects the captured image to image processing and stores the thus processed image to storage device 104.

Subsequently, in step S102, angle measurement data is obtained. Computer 102A, more specifically, angle conversion unit 62 obtains from encoder 51 boom angle θb, dipper stick angle θa and bucket angle θk detected by encoder 51. Data of angles thus obtained is assumed to be assigned to a captured image. Measurement data detected at a point in time at which an image is captured is associated with (or labeled for) that captured image. As shown in FIG. 8, training data 61A, 61B, 61C, . . . including a captured image and an angle of work implement 2 obtained when the image is captured are created. Training data 61A, 61B, 61C, . . . configure a training data set for training position estimation model 80A.

The training data includes a plurality of captured images of work implement 2 in different postures, as shown in FIG. 8. The training data may include a plurality of images of work implement 2 captured in the same posture in different environments such as daytime, backlight, and nighttime.

Subsequently, in step S103, a relative position of work implement 2 is output. Computer 102A, more specifically, work implement position estimation unit 65, reads position estimation model 80A from storage device 104. Position estimation model 80A includes a neural network shown in FIG. 8. The neural network includes an input layer 81A, an intermediate layer (or a hidden layer) 82A, and an output layer 83A. Each layer 81A, 82A, 83A has one or more neurons. The number of neurons in each layer 81A, 82A, 83A can be set as appropriate.

Immediately adjacent layers have their neurons connected together, and for each connection a weight (a connection weight) is set. The number of connections of neurons may be set as appropriate. A threshold value is set for each neuron, and an output value of each neuron is determined by whether a sum of products of a value input to each neuron and a weight exceeds the threshold value.

Position estimation model 80A is trained to determine a relative position of work implement 2 from a captured image. Through training, a parameter is obtained for position estimation model 80A, and the parameter is stored to storage device 104. The parameter includes, for example, the number of layers of the neural network, the number of neurons in each layer, a relation between neurons in connectivity, a weight applied to a connection between each neuron and another neuron, and a threshold value for each neuron.

Work implement position estimation unit 65 inputs an image captured by imaging device 50 to input layer 81A. Output layer 83A outputs a position of work implement 2 relative to main body 1, more specifically, a value indicating boom angle θb, dipper stick angle θa and bucket angle θk. For example, computer 102A uses the captured image as an input to input layer 81A to perform a computation process for a forward propagation through the neural network of position estimation model 80A. As a result, computer 102A obtains an estimated relative position of work implement 2 as a value output from output layer 83A of the neural network.

Step S102 may not be followed by step S103. Step S102 and Step S103 may be performed at the same time, or step S103 may precede step S102.

Subsequently, in step S104, a difference is calculated between the estimated position of work implement 2 output in step S103 and the measurement data of the angles of work implement 2 obtained in step S102. Computer 102A, more specifically, error detection unit 66, compares the relative position of work implement 2 estimated from the captured image and output from output layer 83A of position estimation model 80A with the measured relative position of work implement 2 as obtained in angle conversion unit 62 to calculate an error of the estimated value with respect to the true value of the relative position of work implement 2.

Computer 102A trains position estimation model 80A using a captured image as input data and a relative position of work implement 2 measured when the image is captured as training data. From the calculated error of the output value, computer 102A calculates through backpropagation an error of a weight applied to a connection between each neuron and another neuron and an error of the threshold value of each neuron.

Subsequently, in step S105, position estimation model 80A is updated. Computer 102A, more specifically, position estimation model update unit 67, updates parameters of position estimation model 80A such as a weight applied to a connection between each neuron and another neuron and each neuron's threshold value, based on the error of the estimated value with respect to the true value of the relative position of work implement 2, as calculated in error detection unit 66, so that a value closer to the true value can be output when the same captured image is input to input layer 81A. The updated parameters of position estimation model 80A are stored to storage device 104.

When estimating a relative position of work implement 2 next time, a captured image is input to position estimation model 80A updated and a result of an estimation of the relative position of work implement 2 is obtained. Computer 102A repeats step S101 to step S105 until the result of the estimation of the relative position of work implement 2 that is output by position estimation model 80A matches the measured relative position of work implement 2. Position estimation model 80A thus has its parameters optimized and is thus trained.

Once position estimation model 80A has sufficiently been trained and as a result come to output a sufficiently accurate estimation result, computer 102A finishes training position estimation model 80A. Position estimation model 80A has thus been trained. Then, the process ends (end).

Figure 9:
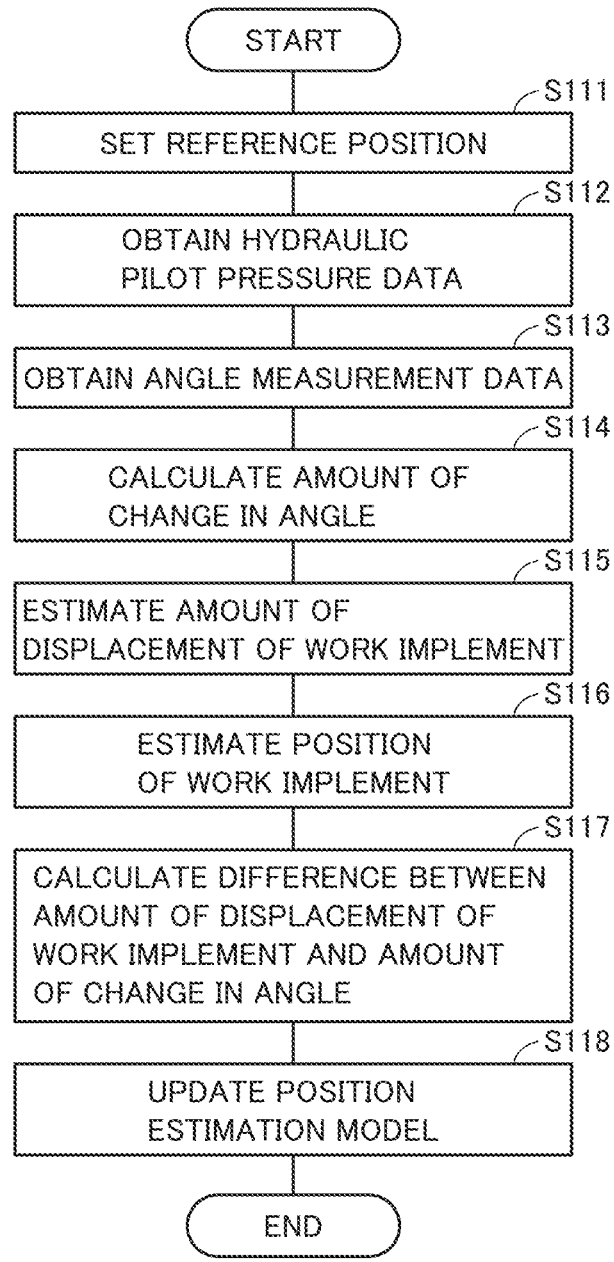
FIG. 9 is a flowchart of a method for producing a second position estimation model trained.
Figure 10:
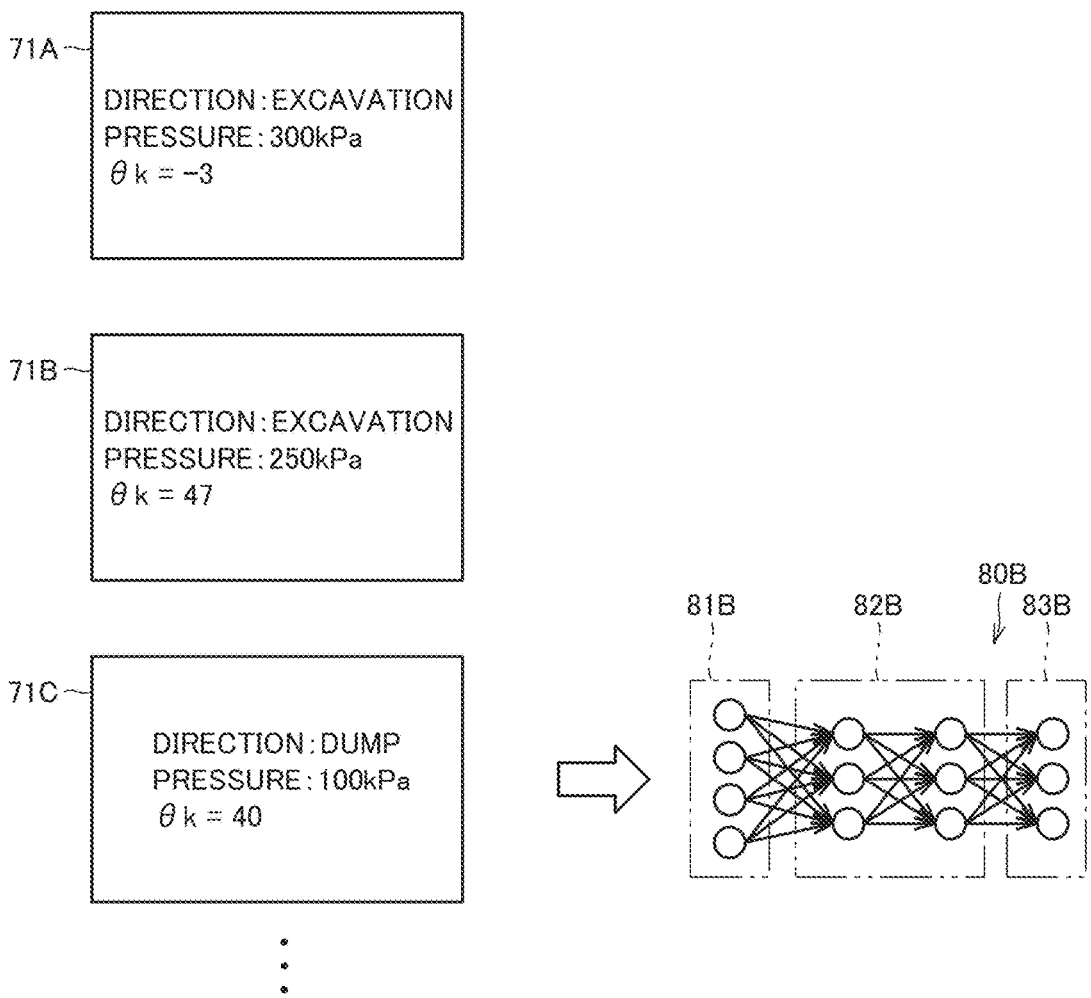
FIG. 10 is a schematic diagram showing a process for training the second position estimation model.

FIG. 9 is a flowchart of a method for producing a second position estimation model trained. FIG. 10 is a schematic diagram showing a process for training the second position estimation model. Although there is some overlapping with what is described with reference to FIG. 6, a process for training position estimation model 80B (the second position estimation model) for estimating a relative position of work implement 2 relative to main body 1 will now be described below with reference to FIGS. 9 and 10.

As shown in FIG. 9, initially, in step S111, a reference position is set for work implement 2. When obtaining an output value indicating boom angle θb, dipper stick angle θa and bucket angle θk from a captured image through position estimation model 80A, computer 102A also obtains accuracy of a result of estimation, that is, at what probability in % the current boom angle θb, dipper stick angle θa and bucket angle θk can be estimated based on the captured image. The reference position for work implement 2 can for example be a position of work implement 2, as estimated by position estimation model 80A, that is assumed immediately before accuracy of estimation in estimating a position of work implement 2 from a captured image through position estimation model 80A falls below a predetermined value.

A threshold value for accuracy of estimation by position estimation model 80A when setting a reference position for work implement 2 can be set to 70% or more, e.g., 75% or more, 80% or more, 85% or more, or 90% or more.

Subsequently, in step S112, hydraulic pilot pressure data is obtained. Computer 102A obtains from pressure sensor 36 a value of hydraulic pilot pressure sensed by pressure sensor 36. Computer 102A may obtain in real time the hydraulic pilot pressure sensed by pressure sensor 36. Computer 102A may obtain the hydraulic pilot pressure from pressure sensor 36 at a predetermined time or whenever a predetermined period of time elapses. Computer 102A stores the obtained hydraulic pilot pressure to storage device 104.

Subsequently, in step S113, angle measurement data is obtained. Computer 102A, more specifically, angle conversion unit 62 obtains from encoder 51 boom angle θb, dipper stick angle θa and bucket angle θk detected by encoder 51. Data of angles thus obtained is assumed to be assigned to hydraulic pilot pressure. Angle measurement data obtained at a point in time at which hydraulic pilot pressure is obtained is associated with (or labeled for) that hydraulic pilot pressure.

As shown in FIG. 10, training data 71A, 71B, 71C, . . . including a direction of a movement of work implement 2 (e.g., the dumping or excavating movement of bucket 8) and hydraulic pilot pressure, as sensed by pressure sensor 36, and a position of work implement 2 at a point in time at which hydraulic pilot pressure is sensed (e.g., bucket angle θk), are created. Training data 71A, 71B, 71C, . . . configure a training data set for training position estimation model 80B.

Subsequently, in step S114, an amount of change in angle of work implement 2 is calculated. Computer 102A, more specifically, angular change calculation unit 72 calculates an amount of displacement of work implement 2 (e.g., an amount of change of bucket angle θk) from two training data 71A, 71B, 71C, . . . created at different points in time. Computer 102A also obtains variation in hydraulic pilot pressure made at that time.

Subsequently, in step S115, an amount of displacement of work implement 2 is estimated. Computer 102A, more specifically, work implement displacement estimation unit 71 reads position estimation model 80B from storage device 104. Position estimation model 80B includes the neural network shown in FIG. 10. The neural network includes an input layer 81B, an intermediate layer (or a hidden layer) 82B, and an output layer 83B. Each layer 81B, 82B, 83B has one or more neurons. The number of neurons in each of layers 81B, 82B, 83B can be set as appropriate.

Neurons in adjacent layers are connected to each other, and a weight (a synaptic weight) is set for each connection. How many neurons are connected may be set as appropriate. A threshold value is set for each neuron, and an output value of each neuron is determined depending on whether a sum of products of a value input to each neuron and a weight exceeds the threshold value.

Position estimation model 80B is trained to determine an amount of displacement of work implement 2 from hydraulic pilot pressure. Parameters for position estimation model 80B are obtained through training and stored to storage device 104. The parameters for position estimation model 80B for example include the number of layers of the neural network, the number of neurons in each layer, a relationship between neurons in connectivity, a weight applied to a connection between each neuron and another neuron, and a threshold value for each neuron.

Work implement displacement estimation unit 71 inputs to input layer 81B the hydraulic pilot pressure sensed by pressure sensor 36. Output layer 83B outputs an output value indicating an amount of displacement of work implement 2, more specifically, an amount of change of bucket angle θk. For example, computer 102A uses the hydraulic pilot pressure as an input to input layer 81B to compute forward propagation of the neural network of position estimation model 80B. Thus, computer 102A obtains an estimated amount of displacement of work implement 2 as an output value output from the neural network at output layer 83B.

In addition to the hydraulic pilot pressure for sensing the dumping or excavating movement of bucket 8, hydraulic pilot pressure for sensing the ascending or descending movement of boom 6 and hydraulic pilot pressure for sensing the dumping or excavating movement of dipper stick 7 may be input to input layer 81B. The output value output from output layer 83B may include amounts of changes in boom angle θb and dipper stick angle θa in addition to an amount of change of bucket angle θk. The data input to input layer 81B may include the rotational speed of engine 31, the displacement of hydraulic pump 33, and the like in addition to hydraulic pilot pressure, and accuracy of estimation of an amount of displacement of work implement 2 can be improved by these additional input data.

Subsequently, in step S116, a position of work implement 2 is estimated. Computer 102A, more specifically, work implement position estimation unit 75 adds the result of estimation of the amount of displacement of work implement 2 between a point in time at which a reference position for work implement 2 is set in step S111 and the current point in time to the reference position to obtain an output of an estimated current position of work implement 2.

Steps S113 and S114 may not be followed by steps S115 and S116. Steps S113 and S114 and steps S115 and S116 may be performed simultaneously, or steps S113 and S114 may be performed after steps S115 and S116.

Subsequently, in step S117, a difference is calculated between the amount of displacement of work implement 2 calculated in step S114 and the estimated amount of displacement of work implement 2 output in step S115. Computer 102A, more specifically, error detection unit 76 compares the estimated amount of displacement of work implement 2 estimated from hydraulic pilot pressure or the like and output from position estimation model 80B at output layer 83B with the amount of change in angle of work implement 2 that is obtained by angular change calculation unit 72 to calculate an error of an estimated value with respect to a true value of an amount of displacement of work implement 2.

Computer 102A trains position estimation model 80B using hydraulic pilot pressure or the like as input data, and as training data an amount of displacement by which work implement 2 is positionally changed between the point in time at which the reference position is set and the point in time at which the hydraulic pilot pressure is sensed. From an error of an output value, as calculated, computer 102A calculates through back propagation a weight applied to a connection between each neuron and another neuron and a respective error of the threshold value for each neuron.

Subsequently, in step S118, position estimation model 80B is updated. Computer 102A, more specifically, position estimation model update unit 77 updates parameters of position estimation model 80B, such as a weight applied to a connection between each neuron and another neuron and the threshold value for each neuron, based on the error of the estimated value with respect to the true value of the amount of displacement of work implement 2, as calculated by error detection unit 76. And once the same captured image is input to input layer 81B, an output value closer to the true value can be output. Position estimation model 80B has an updated parameter stored to storage device 104.

When an amount of displacement of work implement 2 is subsequently estimated, hydraulic pilot pressure is input to the updated position estimation model 80B to obtain an output of a result of estimation of an amount of displacement of work implement 2. Computer 102A repeats step S111 to step S118 until a result of estimation of an amount of displacement of work implement 2 that is output by position estimation model 80B matches a result of measurement of the amount of displacement of work implement 2. In this way, position estimation model 80B has its parameters optimized and is thus trained.

Once position estimation model 80B has sufficiently been trained, and as a result come to output a sufficiently accurate estimation result, computer 102A ends training position estimation model 80B. Trained position estimation model 80B is thus produced. Then, the process ends (END).

Initial values for a variety of parameters of position estimation models 80A, 80B may be provided by a template. Alternatively, the initial values for the parameters may be manually provided by human input. When re-training position estimation models 80A, 80B, computer 102A may prepare initial values for the parameters based on values stored in storage device 104 as the parameters of position estimation models 80A, 80B to be re-trained.

Figure 11:
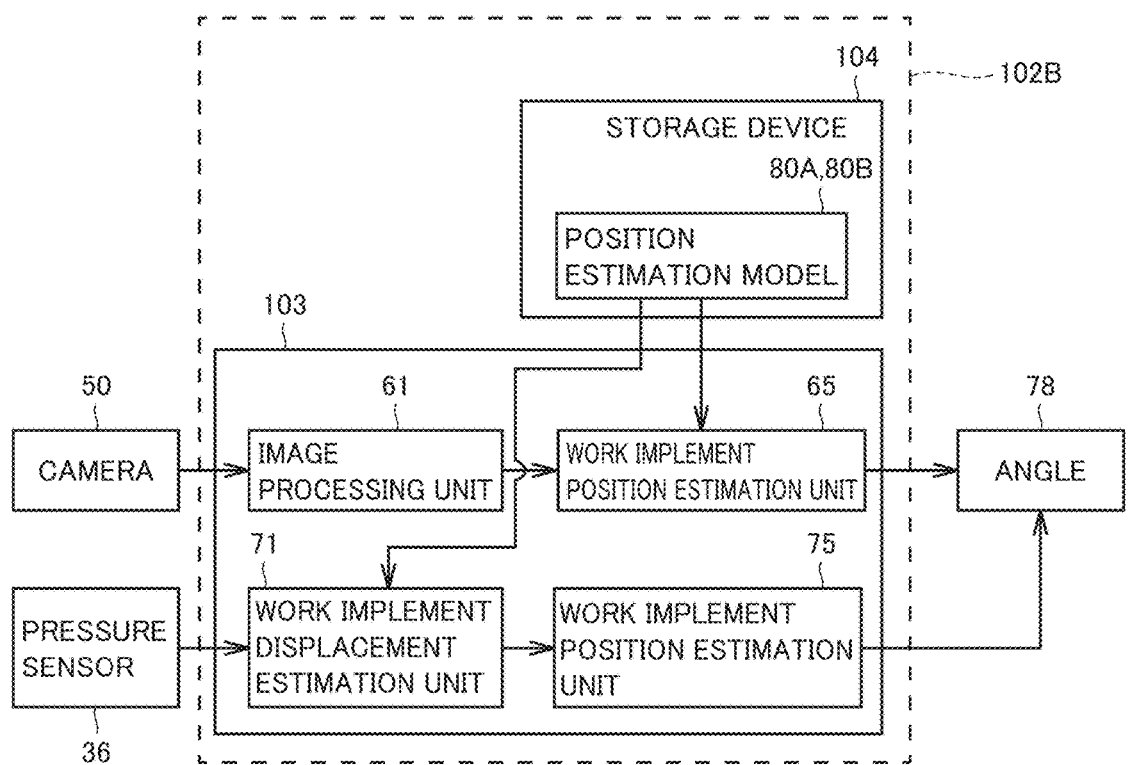
FIG. 11 is a functional block diagram generally showing an internal configuration of the computer when shipped from a factory.

FIG. 11 is a block diagram generally showing an internal configuration of computer 102B shipped from a factory. Encoder 51 is temporarily attached to work implement 2 for the purpose of training position estimation models 80A, 80B before shipment, and is removed from work implement 2 once training position estimation models 80A, 80B has been completed. Hydraulic excavator 100 shipped from the factory does not include encoder 51. Hydraulic excavator 100 shipped from the factory includes only imaging device 50, pressure sensor 36 and computer 102B (processor 103 and storage device 104) out of the system configuration shown in FIG. 6.

Figure 12:
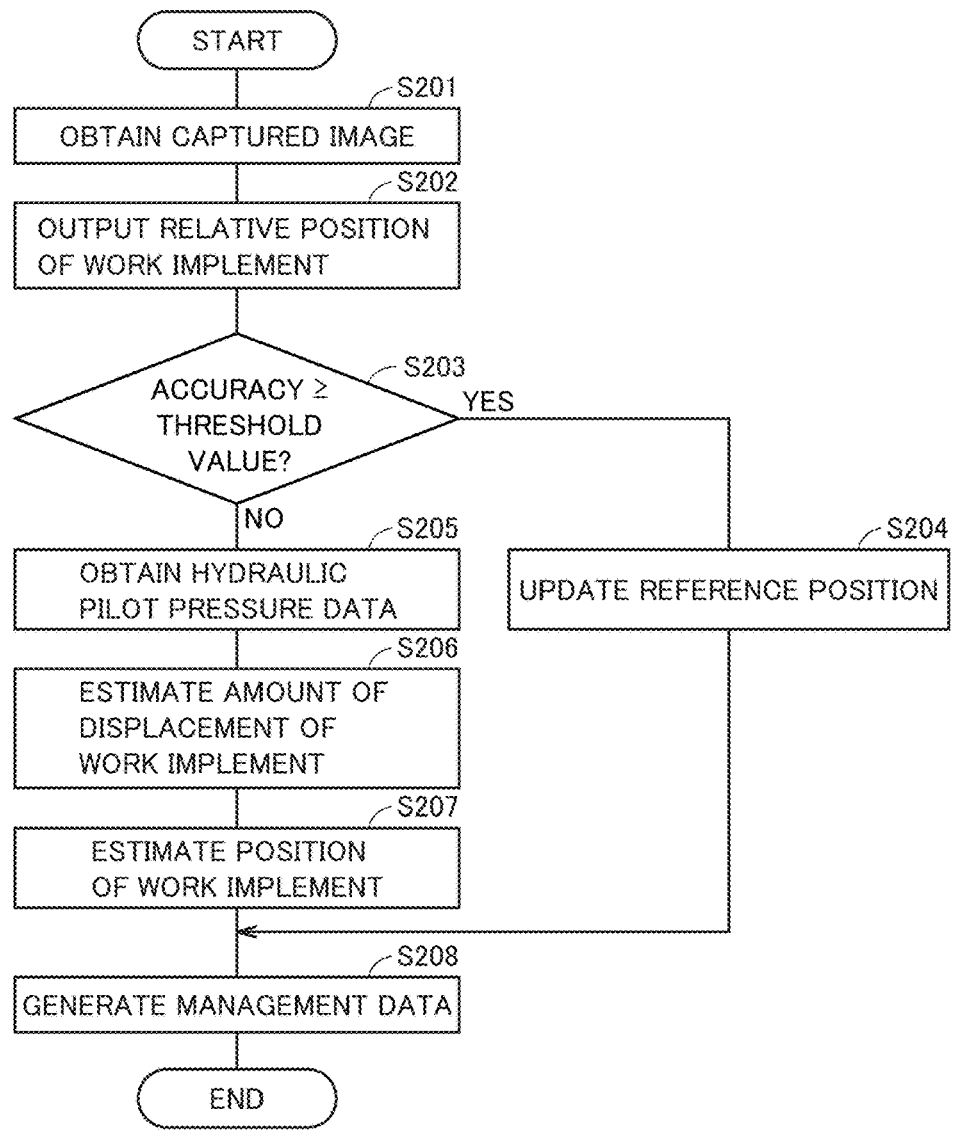
FIG. 12 is a flowchart of a process performed by the computer to estimate a relative position of a work implement after shipment from a factory.
Figure 13:
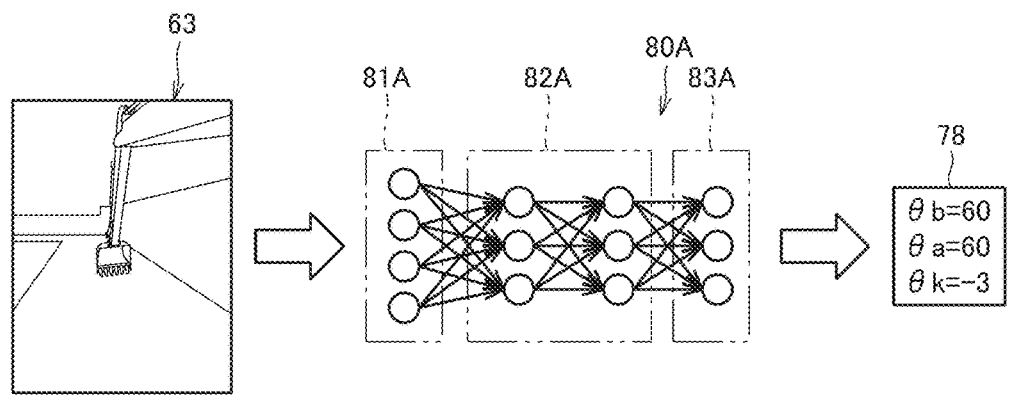
FIG. 13 is a schematic diagram showing a process of estimating a relative position of the work implement from a captured image using a trained position estimation model.
Figure 14:
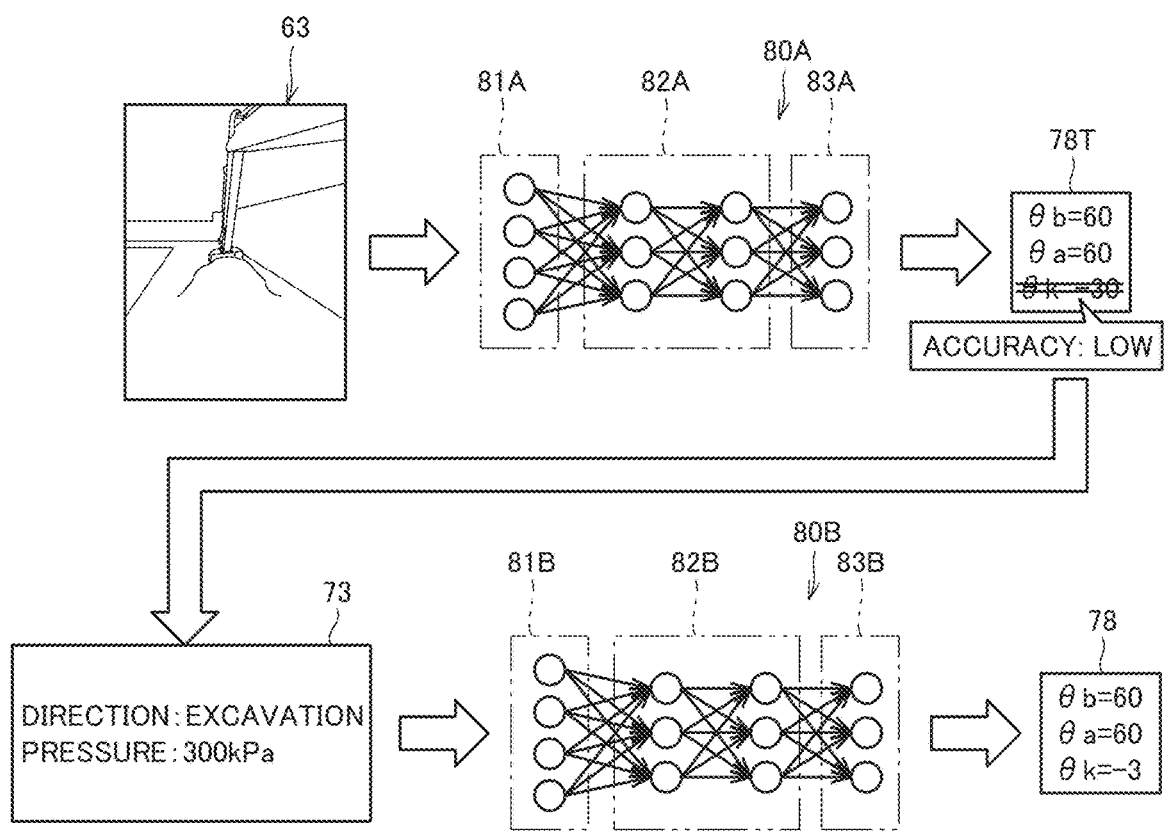
FIG. 14 is a schematic diagram showing a process of estimating a relative position of the work implement from a captured image and an operation command value using a trained position estimation model.

FIG. 12 is a flowchart of a process performed by computer 102B to estimate a relative position of work implement 2 after shipment from a factory. FIG. 13 is a schematic diagram representing a process for estimating a relative position of work implement 2 from a captured image by using position estimation model 80A that has been trained so as to determine the relative position of work implement 2 from the captured image. FIG. 14 is a schematic diagram showing a process of estimating a relative position of work implement 2 from a captured image and an operation command value through trained position estimation model 80A and position estimation model 80B trained to obtain a relative position of work implement 2 from hydraulic pilot pressure. With reference to FIGS. 11 to 14, a process for estimating a relative position of work implement 2 from a captured image obtained at a work site after shipment from a factory and hydraulic pilot pressure will be described below.

Initially, in step S201, a captured image is obtained. Computer 102B, more specifically, image processing unit 61 obtains from imaging device (a camera) 50 an image 63 (see FIG. 13) captured by imaging device 50.

Subsequently, in step S202, a relative position of work implement 2 is output. Computer 102B, more specifically, work implement position estimation unit 65 reads position estimation model 80A and a trained parameter's optimal value from storage device 104 to obtain position estimation model 80A trained. Work implement position estimation unit 65 uses image 63 captured by imaging device 50 as data input to position estimation model 80A trained. Work implement position estimation unit 65 inputs the captured image 63 to each neuron included in input layer 81A of position estimation model 80A trained. Position estimation model 80A trained outputs from output layer 83A an estimated position of work implement 2 relative to main body 1, more specifically, an angular output value 78 indicating boom angle θb, dipper stick angle θa and bucket angle θk (see FIG. 13).

Subsequently, in step S203, whether boom angle θb, dipper stick angle θa and bucket angle θk output in step S202 have accuracy equal to or greater than a threshold value is determined. When it is determined that boom angle θb, dipper stick angle θa and bucket angle θk all have accuracy equal to or greater than the threshold value and are thus all estimated with high accuracy, it is determined that boom angle θb, dipper stick angle θa and bucket angle θk output in step S202 determine a relative position of work implement 2 relative to main body 1 for the current point in time.

As shown in captured image 63 of FIG. 13, when work implement 2 has boom 6, dipper stick 7 and bucket 8 all clearly captured in captured image 63, position estimation model 80A can be used to obtain an output of angular output value 78 with high accuracy. In this case, a determination of YES is made in step S203, and the control proceeds to step S204 to update the reference position. Computer 102B updates angular output value 78 that is output in step S202 as a reference position used in a subsequent process, and stores to storage device 104 the updated reference position and a point in time at which angular output value 78 is output in step S202.

In contrast, as shown in FIG. 14, when an excavation work is performed with work implement 2 or the like, bucket 8 may be hidden in soil and may not be clearly captured in captured image 63. As indicated by a temporary angular output value 78T, there is a case in which while it is determined that boom angle θb and dipper stick angle θa are estimated with high accuracy, bucket angle θk has low accuracy less than a threshold. In such a case, it is not necessarily appropriate to use bucket angle θk that is estimated through position estimation model 80A as it is.

In the process flow of FIG. 12, when one or more angles of boom angle θb, dipper stick angle θa and bucket angle θk output from position estimation model 80A have accuracy less than the threshold value, a determination of NO is made in step S203. In this case, the control proceeds to step S205 to obtain hydraulic pilot pressure data. Computer 102B obtains from pressure sensor 36 hydraulic pilot pressure data 73 sensed by pressure sensor 36 (see FIG. 14). As shown in FIG. 14, hydraulic pilot pressure data 73 includes a direction of movement of a target of positional estimation (in this example, bucket 8), and hydraulic pilot pressure sensed by pressure sensor 36 corresponding to the direction of movement.

Subsequently, in step S206, an amount of displacement of work implement 2 is estimated. Computer 102B, more specifically, work implement displacement estimation unit 71 reads position estimation model 80B and an optimal value of a trained parameter from storage device 104 to obtain position estimation model 80B trained. Work implement displacement estimation unit 71 inputs hydraulic pilot pressure data 73 to each neuron included in input layer 81B of trained position estimation model 80B. From output layer 83B of trained position estimation model 80B is output an estimated amount of displacement of work implement 2, specifically, an amount of change in angle of a target of positional estimation, or bucket 8, (i.e., an amount of change of bucket angle θk).

Subsequently, in step S207, a position of work implement 2 is estimated. Computer 102B, more specifically, work implement position estimation unit 75 reads a reference position for work implement 2 from storage device 104. Work implement position estimation unit 75 estimates the current position of work implement 2 by adding to the reference position for work implement 2 an amount of displacement of work implement 2 from a point in time at which the reference position is updated in step S204. In this way, a position of a target of positional estimation (in this example, bucket 8) (i.e., bucket angle θk) is estimated. Then, as shown in FIG. 14, angular output value 78 including boom angle θb, dipper stick angle θa and bucket angle θk is output.

Finally, in step S208, computer 102B generates management data including a relative position of work implement 2 relative to main body 1. Computer 102B stores the management data to storage device 104. Then, the process ends (END).

As has been described above, in the system according to the embodiment, computer 102B includes trained position estimation model 80B for determining a position of a target of positional estimation. As shown in FIGS. 12 and 14, computer 102B obtains hydraulic pilot pressure data 73 as an operation command value causing work implement 2 to move based on operation of first and second control levers 25R and 25L. Computer 102B uses trained position estimation model 80B to estimate an amount of displacement of work implement 2 from hydraulic pilot pressure data 73. Computer 102B further outputs an estimated position of a target of positional estimation that is estimated from a reference position for work implement 2 and an amount of displacement thereof from the reference position.

Thus, a posture of work implement 2 can be estimated using position estimation model 80B of artificial intelligence suitable for estimating a position of work implement 2 relative to main body 1. Thus, the posture of work implement 2 can be easily and accurately determined by computer 102B using artificial intelligence.

As work implement 2's posture can be estimated from hydraulic pilot pressure data 73, a sensor can be dispensed with for sensing boom angle θb, dipper stick angle θa and bucket angle θk. As the sensor is absent, its durability does not affect the operation of hydraulic excavator 100, either. This allows a simple, inexpensive and highly reliable configuration to be used to determine the current posture of work implement 2, similarly as done in hydraulic excavator 100 as conventional.

Figure 15:
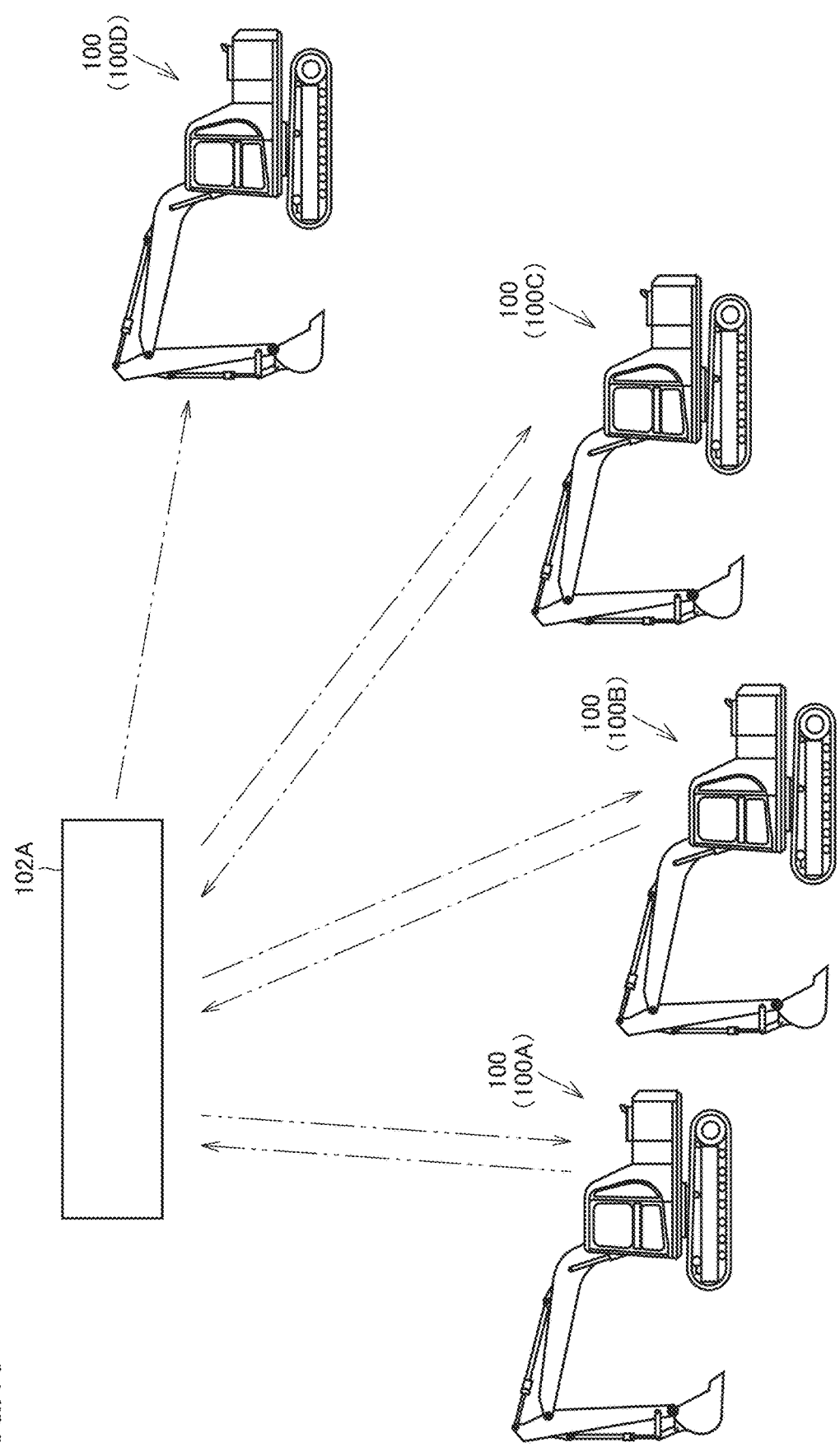
FIG. 15 is a schematic diagram showing a modified example relating to training a position estimation model.

FIG. 15 is a schematic diagram showing an exemplary variation relating to training position estimation models 80A and 80B. In the description for FIGS. 6 to 10 has been described an example in which position estimation models 80A and 80B are trained before shipment of hydraulic excavator 100 from a factory. Training data for training position estimation models 80A and 80B may be collected from a plurality of hydraulic excavators 100.

FIG. 15 shows a first hydraulic excavator 100 (a hydraulic excavator 100A), a second hydraulic excavator 100 (a hydraulic excavator 100B), a third hydraulic excavator 100 (a hydraulic excavator 100C), and a fourth hydraulic excavator 100 (a hydraulic excavator 100D), which are of the same model. Hydraulic excavators 100A, 100B, 100C include imaging device 50 and encoder 51. Hydraulic excavators 100A, 100B, 100C have been shipped from a factory and are currently each located at a work site.

Computer 102A obtains an image captured by imaging device 50 from each of hydraulic excavators 100A, 100B, 100C. Computer 102A also obtains from each of hydraulic excavators 100A, 100B, 100C, in association with the captured image, boom angle θb, dipper stick angle θa and bucket angle θk measured when the image is captured. Computer 102A uses the captured image and angles of work implement 2 obtained at the same time to train position estimation model 80A so that a relative position of work implement 2 estimated from a captured image can be obtained.

Computer 102A obtains from each of hydraulic excavators 100A, 100B and 100C hydraulic pilot pressure sensed by pressure sensor 36. Computer 102A also obtains from each of hydraulic excavators 100A, 100B, and 100C boom angle θb, dipper stick angle θa and bucket angle θk measured at a point in time at which hydraulic pilot pressure is sensed, and computer 102A associates the angles with the hydraulic pilot pressure. Computer 102A uses the hydraulic pilot pressure and the angle of work implement 2 that are obtained at the same time to train position estimation model 80B so that an estimated relative position of work implement 2 can be determined from the hydraulic pilot pressure.

Computer 102A may obtain a captured image and measurement data of angles of work implement 2 from each of hydraulic excavators 100A, 100B, 100C via communication interface 105 (see FIG. 5). Alternatively, computer 102A may obtain a captured image and measurement data of angles of work implement 2 from each hydraulic excavator 100A, 100B, 100C via external storage medium 109.

Computer 102A may be located at the same work site as hydraulic excavators 100A, 100B, 100C. Alternatively, computer 102A may be located in a remote place away from a work site, such as a management center for example. Hydraulic excavators 100A, 100B, 100C may be located at the same work site or at different work sites.

Position estimation models 80A, 80B trained are provided to each hydraulic excavator 100A, 100B, 100C via communication interface 105, external storage medium 109, or the like. Each hydraulic excavator 100A, 100B, 100C is thus provided with position estimation models 80A, 80B trained.

When position estimation models 80A, 80B are already stored in each hydraulic excavator 100A, 100B, 100C, position estimation models 80A, 80B stored are overwritten. Position estimation models 80A, 80B may be overwritten periodically by periodically collecting training data and training position estimation models 80A, 80B, as described above. Whenever position estimation models 80A, 80B have a parameter updated, the latest, updated value is stored to storage device 104.

Position estimation models 80A, 80B trained are also provided to hydraulic excavator 100D. Position estimation models 80A, 80B are provided to both hydraulic excavators 100A, 100B, 100C that provide training data and hydraulic excavator 100D that does not provide training data. Hydraulic excavator 100D may be located at the same work site as any of hydraulic excavators 100A, 100B, 100C, or may be located at a work site different than hydraulic excavators 100A, 100B, 100C. Hydraulic excavator 100D may be before shipment from a factory.

Figure 16:
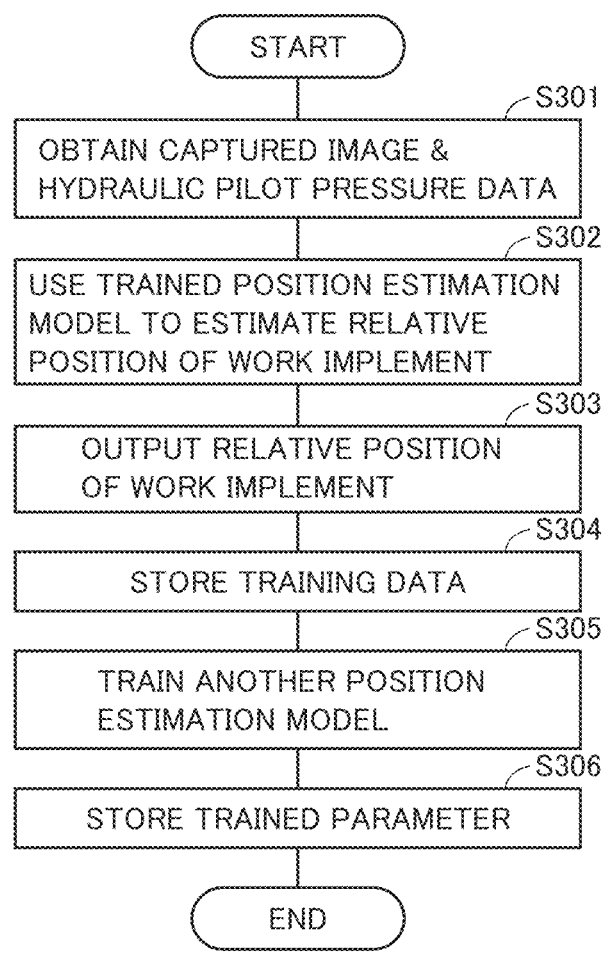
FIG. 16 is a flowchart of a process for generating a distillation model.

Position estimation models 80A, 80B described above are not limited to a model trained through machine learning using training data 61A, 61B, 61C, . . . and training data 71A, 71B, 71C, . . . and may be a model generated using the trained model. For example, position estimation models 80A, 80B may be another trained model (a distillation model) trained based on a result obtained by repeatedly inputting/outputting data to/from a trained model. FIG. 16 is a flowchart of a process for generating a distillation model.

As shown in FIG. 16, initially, in step S301, a captured image and hydraulic pilot pressure data are obtained. Computer 102A, more specifically, image processing unit 61 obtains from imaging device (a camera) 50 image 63 (see FIG. 13) captured by imaging device 50. Computer 102A obtains from pressure sensor 36 data 73 of hydraulic pilot pressure sensed by pressure sensor 36 (see FIG. 14).

Subsequently, in step S302, computer 102A uses trained position estimation models 80A, 80B to obtain an estimated position of work implement 2 relative to main body 1. In step S303, computer 102A outputs the estimated relative position of work implement 2.

Computer 102A, more specifically, work implement position estimation unit 65 reads trained position estimation model 80A from storage device 104. Work implement position estimation unit 65 inputs image 63 captured by imaging device 50 to input layer 81A of trained position estimation model 80A. Trained position estimation model 80A outputs from output layer 83A a result of an estimation of a position of work implement 2 relative to main body 1, more specifically, angular output value 78 (see FIG. 11) indicating boom angle θb, dipper stick angle θa and bucket angle θk.

Computer 102A, more specifically, work implement displacement estimation unit 71 reads trained position estimation model 80B from storage device 104. Work implement displacement estimation unit 71 inputs hydraulic pilot pressure sensed by pressure sensor 36 to input layer 81B of trained position estimation model 80B. Trained position estimation model 80B outputs at output layer 83B a result of estimation of an amount of displacement of work implement 2, specifically, an amount of displacement of a target of positional estimation (e.g., bucket 8) (e.g., an amount of change of bucket angle θk).

Subsequently, in step S304, computer 102A stores to storage device 104 as training data the captured image and hydraulic pilot pressure obtained in step S301 and the result of the estimation of the relative position of work implement 2 output in step S303.

Subsequently, in step S305, computer 102A uses the trained model to train another position estimation model. Computer 102A inputs a captured image and hydraulic pilot pressure to an input layer of the other position estimation model. Computer 102A outputs from an output layer of the other position estimation model an output value indicating a result of an estimation of a position of work implement 2 relative to main body 1, more specifically, boom angle θb, dipper stick angle θa and bucket angle θk. A difference is calculated between the relative position of work implement 2 output from the other position estimation model and the relative position of work implement 2 output from trained position estimation models 80A, 80B in step S303. Based on this difference, computer 102A updates the other position estimation model's parameters. The other position estimation model is thus trained.

Finally, in step S306, the updated parameters of the other position estimation model are stored to storage device 104 as trained parameters. Then, the process ends (END).

Thus, a captured image of work implement 2 and hydraulic pilot therefor, and a relative position of work implement 2 estimated through a trained position estimation model can be used as training data to train another position estimation model (or obtain a distillation model), and computer 102A can use the other position estimation model that is simpler than the trained position estimation model to estimate a position of work implement 2 relative to main body 1. This can alleviate a load imposed on computer 102A for estimating the relative position of work implement 2. Computer 102A may train the other position estimation model by using training data generated by another computer.

In the above embodiment, position estimation models 80A, 80B include a neural network. This is not exclusive, however, and position estimation models 80A, 80B may be a model, such as a support vector machine, capable of accurately estimating a position of work implement 2 relative to main body 1 from a captured image of work implement 2 through machine learning.

In the above-described embodiment, a position of boom 6 and that of dipper stick 7 are estimated from a captured image through trained position estimation model 80A and a position of bucket 8 is estimated from hydraulic pilot pressure through trained position estimation model 80B by way of example. Trained position estimation model 80B is also similarly applicable in estimating a position of an attachment other than bucket 8. When bucket 8 is clearly captured in a captured image and its position can be accurately estimated from the captured image, whereas a portion of work implement 2 other than bucket 8, that is, boom 6 or dipper stick 7, is unclear in the captured image, the position of boom 6 or dipper stick 7 may be estimated from hydraulic pilot pressure.

An amount of displacement of work implement 2 from a reference position therefor may be calibrated at an end of a stroke of the hydraulic cylinder. For example, when the target of positional estimation is bucket 8, bucket angle θk when bucket cylinder 12 has a maximum stroke length and that when bucket cylinder 12 has a minimum stroke length can previously be stored in storage device 104. By comparing an estimated bucket angle θk with bucket angle θk that is stored in storage device 104 when bucket cylinder 12 moves to reach the end of the stroke, the estimated bucket angle θk can be calibrated to improve accuracy of estimating an amount of displacement of work implement 2.

While operating device 25 is an operating device of a pilot hydraulic type in the above embodiment, operating device 25 may be an electric operating device. For example, operating device 25 may include an operating member such as an electric lever, and an actuation amount sensor, such as a potentiometer as an angle meter that electrically senses an amount of tilting of the operating member. The actuation amount sensor senses tilt and outputs data thereof to computer 102A. A pilot oil channel 450 is provided to interconnect hydraulic pump 33 and directional control valve 34 while bypassing operating device 25, and pilot oil channel 450 is provided with a control valve for controlling hydraulic pilot pressure. Based on data of sensing by the actuation amount sensor, computer 102A outputs a control signal for driving the control valve. Based on hydraulic pilot pressure regulated by the control valve, directional control valve 34 is controlled to thus regulate an amount of hydraulic oil supplied to hydraulic actuator 40. In this case, the data of sensing by the actuation amount sensor corresponds to an operation command value causing work implement 2 to make a movement based on operation of the operating member.

The work machine to which the idea of the present disclosure is applicable is not limited to a hydraulic excavator, and may be a work machine having a work implement, such as a bulldozer, a motor grader, or a wheel loader.

The presently disclosed embodiments are to be considered as illustrative in any respect and not restrictive. The scope of the present invention is not indicated by the above description but by the scope of the claims, and is intended to include meaning equivalent to the terms of the claims and any modifications within the scope.

REFERENCE SIGNS LIST

1 main body, 2 work implement, 3 revolving unit, 4 cab, 4S operator's seat, 5 traveling apparatus, 6 boom, 7 dipper stick, 8 bucket, 8a tooth tip, 10 boom cylinder, 11 dipper stick cylinder, 12 bucket cylinder, 13 boom pin, 14 dipper stick pin, 15 bucket pin, 16 first link member, 17 second link member, 18 first link pin, 19 bucket cylinder top pin, 20 second link pin, 21 antenna, 23 global coordination computation unit, 25 operating device, 25L second control lever, 25R first control lever, 31 engine, 33 hydraulic pump, 34 directional control valve, 36 pressure sensor, 40 hydraulic actuator, 50 imaging device, 51 encoder, 61 image processing unit, 61A, 61B, 61C, 71A, 71B, 71C training data, 62 angle conversion unit, 63 captured image, 65, 75 work implement position estimation unit, 66, 76 error detection unit, 67, 77 position estimation model update unit, 71 work implement displacement estimation unit, 72 angular change calculation unit, 73 hydraulic pilot pressure data, 78 angular output value, 78T temporary angular output value, 80A and 80B position estimation model, 81A and 81B input layer, 82A and 82B intermediate layer, 83A and 83B output layer, 100,100A, 100B, 100C, 100D hydraulic excavator, 102A and 102B computer, 103 processor, 104 storage device, 105 communication interface, 106 I/O interface, 107 input device, 108 output device, 109 external storage medium, 200 control device, 450 pilot oil channel.

The invention claimed is:

1. A system including a work machine, comprising:
a main body of the work machine;
a work implement attached to the main body of the work machine;
an operating member operated to operate the work implement; and
a computer, wherein
the computer has a trained position estimation model to determine a current position of a portion of the work implement to be subject to positional estimation, and
the computer obtains an operation command value causing the work implement to make a movement in response to an operation of the operating member, uses the trained position estimation model to estimate from the operation command value an amount of displacement of the portion of the work implement from a reference position, and outputs a first estimated position that is a current position of the portion of the work implement estimated from the reference position and the amount of displacement.

2. The system according to claim 1, wherein the trained position estimation model undergoes a learning process using a training data set so that when the operation command value is received, the trained position estimation model estimates the amount of displacement of the portion of the work implement from the reference position, and outputs the first estimated position that is the current position of the portion of the work implement estimated from the reference position and the amount of displacement.

3. The system according to claim 1, wherein the trained position estimation model is generated through a learning process using a training data set including a plurality of training data each labeling the amount of displacement of the portion of the work implement from the reference position with respect to the operation command value.

4. The system according to claim 1, wherein the computer uses the trained position estimation model to further estimate a position of another portion of the work implement other than the portion of the work implement.

5. The system according to claim 4, wherein the computer further estimates the position of the anther portion of the work implement other than the portion of the work implement from the operation command value.

6. The system according to claim 4, wherein
the work implement has a boom coupled with the main body of the work machine, a dipper stick coupled with the boom, and a bucket coupled with the dipper stick,
the portion of the work implement is the bucket, and
the another portion of the work implement other than the portion of the work implement is the dipper stick or the boom.

7. The system according to claim 1, further comprising an imaging device that captures an image of the work implement, wherein
the computer further has another trained position estimation model to determine the current position of the portion of the work implement, obtains a captured image of the work implement captured by the imaging device, uses the other trained position estimation model to output a second estimated position that is a current position of the portion of the work implement estimated from the captured image, and
the computer uses the other trained position estimation model to detect accuracy of estimation in determining the second estimated position from the captured image, and when the accuracy of estimation is lower than a predetermined value, the computer uses the trained position estimation model to estimate the first estimated position from the operation command value.

8. The system according to claim 7, wherein the reference position is the second estimated position of the portion of the work implement that is assumed immediately before the accuracy of estimation in determining the second estimated position from the captured image falls below a predetermined value.

9. The system according to claim 7, wherein the computer uses the other trained position estimation model to further estimate a position of another portion of the work implement other than the portion of the work implement from the captured image.

10. The system according to claim 1, further comprising a hydraulic cylinder to operate the work implement, wherein the computer calibrates the amount of displacement at an end of a stroke of the hydraulic cylinder.

11. The system according to claim 1, wherein a position of the work implement is a relative position of the work implement relative to the main body of the work machine.

12. A computer-implemented method comprising:
obtaining an operation command value causing a work implement provided to a main body of a work machine to make a movement; and
using a trained position estimation model for determining a current position of the work implement, obtaining an estimated position that is a current position of the work implement estimated from the operation command value.

13. A method for producing a trained position estimation model, comprising:
obtaining training data including: an operation command value causing a work implement attached to a main body of a work machine to make a movement; and an amount of displacement of the work implement from a reference position, that is obtained when the operation command value is detected; and
training the position estimation model using the training data, wherein the trained position estimation model is for determining a current position of the work implement.

14. The method according to claim 13, wherein the training includes:
using the position estimation model to obtain an estimated amount of displacement that is an amount of displacement of the work implement from the reference position estimated from the operation command value;
calculating an error of the estimated amount of displacement with respect to the amount of displacement; and
updating the position estimation model based on the error.

15. A non-transitory computer-readable storage medium including training data used to train a position estimation model used to determine a current position of a work implement, wherein the instructions cause the processor to:
obtain training data including: an operation command value causing a work implement attached to a main body of a work machine to make a movement; and an amount of displacement of the work implement from a reference position, that is obtained when the operation command value is detected; and
train the position estimation model using the training data, wherein the trained position estimation model is for determining a current position of the work implement.

16. The non-transitory computer-readable storage medium including training data according to claim 15, wherein the amount of displacement includes an amount of displacement from the reference position of a portion of the work implement to be subject to positional estimation.

17. The non-transitory computer-readable storage medium including training data according to claim 16, wherein the amount of displacement further includes an amount of displacement of another portion of the work implement other than the portion of the work implement from the reference position.

18. A method for producing a trained position estimation model, comprising:
obtaining an operation command value causing a work implement provided to a main body of a work machine to make a movement;
using a trained position estimation model to obtain an estimated position that is a current position of the work implement estimated from the operation command value; and
training a position estimation model other than the trained position estimation model using training data including the operation command value and the estimated position.

* * * * *